United States Patent
Verma et al.

(10) Patent No.: US 10,015,554 B1
(45) Date of Patent: Jul. 3, 2018

(54) SYSTEM TO PRESENT ITEMS ASSOCIATED WITH MEDIA CONTENT

(71) Applicant: AMAZON TECHNOLOGIES, INC., Seattle, WA (US)

(72) Inventors: Prashant Verma, Seattle, WA (US); Gonzalo Alvarez Barrio, Seattle, WA (US); Anoop Balakrishnan, Seattle, WA (US); Ronil Sudhir Mokashi, Mercer Island, WA (US); Jason Allan Patrao, Seattle, WA (US); Harith Siddhartha Sadhu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/268,384

(22) Filed: Sep. 16, 2016

(51) Int. Cl.
*H04N 21/422* (2011.01)
*H04N 21/478* (2011.01)
*H04N 21/4728* (2011.01)
*H04N 21/475* (2011.01)

(52) U.S. Cl.
CPC ..... *H04N 21/47815* (2013.01); *H04N 21/475* (2013.01); *H04N 21/4728* (2013.01)

(58) Field of Classification Search
CPC ....... H04N 21/44222; H04N 21/47815; H04N 21/4728; H04N 21/475
See application file for complete search history.

(56) References Cited

U.S. PATENT DOCUMENTS

| | | | |
|---|---|---|---|
| 7,493,636 B2 * | 2/2009 | Kitsukawa | G06Q 20/387 705/14.26 |
| 8,930,977 B1 * | 1/2015 | Swift | H04N 21/44222 725/13 |
| 2011/0173102 A1 * | 7/2011 | Burns | G06Q 30/02 705/27.2 |

* cited by examiner

*Primary Examiner* — Hunter B Lonsberry
(74) *Attorney, Agent, or Firm* — Lindauer Law, PLLC

(57) ABSTRACT

A system provides information to a user viewing content about what items associated with that content is available for acquisition. When the user pauses presentation of the content, the system determines the merchandise associated with the particular scene of the content that the user is currently viewing. The system may also display the items to the user and provide multiple options for purchase, rental, and so forth. The system may enable the user to make a selection to purchase the merchandise, receive an order confirmation, and then resume presentation of the content.

20 Claims, 13 Drawing Sheets

SYSTEM TO PRESENT ITEMS ASSOCIATED WITH MEDIA CONTENT

BACKGROUND

Devices such as tablets, smart phones, media players, eBook reader devices, smart televisions and so forth allow users to access and view a wide variety of content.

Figure 1:
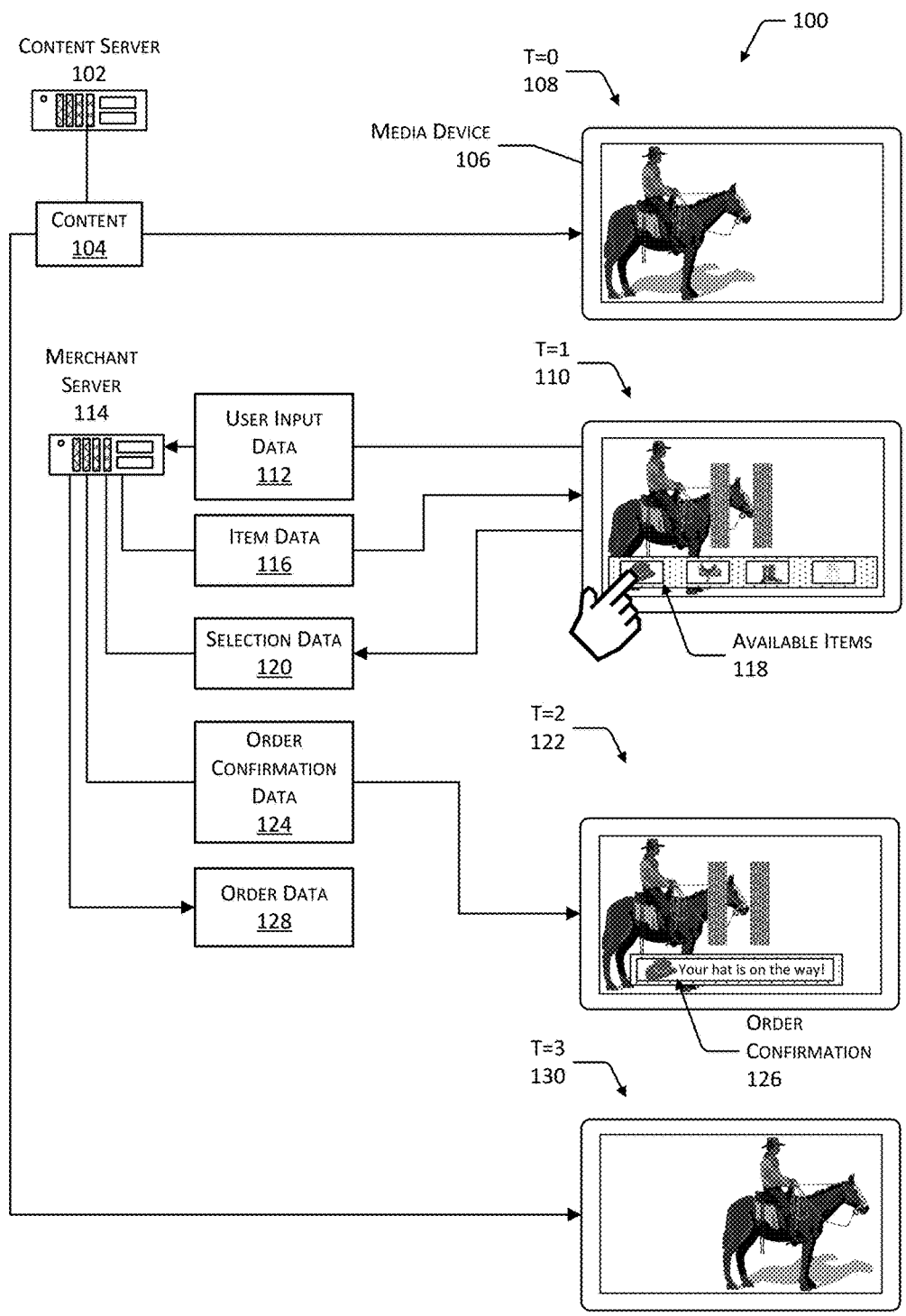
FIG. 1 is a schematic of a system for presenting items for sale that are associated with a portion of content being presented.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Content streaming services provide users the ability to watch content such as movies, television series, self-published videos, listen to music, listen to audiobooks, and so forth. Content may be part of a subscription plan, rented, purchased, checked out, or otherwise provided to the user. Content producers may provide items that are associated with the content. For example, the items may comprise toys, ringtones, or apparel that is representative of a character in the content. These items may be available through different retailers.

Traditionally, a user who decides they want a particular item featured in the content has to interrupt their presentation of the content and take several other actions, or wait until after the presentation is complete and remember to buy the item. For example, while the user is watching the movie "Burnt Sage", they may wish to buy a blanket featuring the likeness of a particular character in the movie. Continuing the example, the user may use another device to access a web browser or shopping application, search for the item, and then be faced with a bewildering array of blankets that feature the likeness. The user may then be confused as to which items are officially sanctioned, which actually match that presented in the movie, and so forth.

If the user waits until after the presentation of the movie is complete, they may forget to make the purchase. However, using a separate system to look-up and find the desired item may result in the purchase of an incorrect item, such as a counterfeit.

This disclosure describes systems and methods for providing items associated with content that a user is consuming. The content may include movies, television series, self-published videos, music, audiobooks, eBooks, and so forth. During presentation of the content, a user may pause presentation. After pausing the content, a user interface is presented that provides information about the items associated with a portion of the content. The user interface provides a seamless, frustration-free and zero latency user experience, as the user does not have to access a separate web browser or shopping application to search for items associated with the portion of the content. Rather, the user interface provides information about the items associated with the portion of the content directly to the user. For example, when video content is paused, information about the items depicted onscreen at the time of the pause may be shown. The user may select a particular item and purchase it without leaving the user interface. Once the user is done, presentation of the content may resume. By having the user interface providing information about the items associated with the portion of the content this enables a seamless, frustration-free, and zero latency user experience.

Operation of the system is supported by one or more computing devices that execute one or more services. For example, a server may receive user input data that is indicative of an input to pause presentation of the content. The user input may be associated with a user touching a screen of a media device to indicate a pause or the user using a remote control to indicate the pause. The server determines a portion of the content presented by a display device contemporaneous with the input. The server may determine a content presentation index data for the portion of the content. The content presentation index data may include one or more of a content identifier, time stamp, a frame number, or a chapter scene.

The server based on the content presentation index data may determine item data indicative of an item, such as a blanket, that was presented in the content within a specified period of time prior to the point at which the presentation was paused. The server device may send to a media device item data indicative of the one or more items currently present in the portion of the media content. By having the server determine the item data indicative of an item that was presented in the content within the specified period the transfer of data is reduced compared to other techniques. This reduction in transfer of data conserves network bandwidth and improves overall performance of the system.

The media device may present the one or more items to order to the user using the display device. For example, the media device may generate a user interface to depict the one or more items. The media device may depict the user interface as an overlay on the paused presentation of the content. In this example, the content may be the movie "Burnt Sage", and the one or more items presented to the user to order may be a blanket featuring the likeness of a particular character in the movie.

The server may determine eligibility data for one or more of the one or more items. For example, the eligibility data may be indicative of the one or more items (e.g., the blanket) included in the item data that are eligible for acquisition.

Eligibility may be based on one or more factors, such as if the item is available for immediate purchase, if the item is available for immediate shipment, user settings or preferences, membership type of a user, type of product, and so forth. For example, a user may have purchased a membership that allows for free or discounted shipping costs. Based on this membership type, the user may be able to receive priority shipping on items that are currently in stock. Given this membership type, the eligibility data may indicate in the item data those items that are currently in stock as being available for purchase. In another example, a user may have account settings that provide a valid payment method, shipping address, and billing address associated with the media device or a user account. Based on this account setting, the user may be able to receive priority shipping on items that are currently in stock or the user may be able to receive an immediate purchase option. Given this account setting, the eligibility data may indicate in the item data those items that are currently in stock as being available and eligible for purchase. The server may send to the media device the eligibility data indicative of the one or more items.

The media device may present an icon indicative of the eligibility of the one or more items to the user using the display device. For example, the media device may depict an icon in the user interface near the blanket. The icon indicates that the blanket is available for immediate purchase.

The server may receive selection data indicative of a selection of an item from the media device. The selection data may indicate that the user has selected to order the blanket. The server may access preloaded pre-confirmation notice data using the item specified by the selection data and send the pre-confirmation notice data indicative of the order to the media device. The media device may present to the user that the order is complete and resume presentation of the media content. The server may complete the order based on the selection data and send a purchase confirmation to the user. By having the pre-confirmation notice data previously available and preloaded, the confirmation of the order may be quickly presented. This significantly reduces the latency and enables the user to quickly resume presentation of the content. Latency is also reduced by having the pre-confirmation notice data preloaded at the server. This allows for a very rapid response to the user input, improving overall performance of the system.

Illustrative System

FIG. 1 illustrates an environment 100 which includes a content server 102 configured to provide content 104 to a media device 106 at time equals zero (T=0) 108. In one implementation, the content 104 may be provided by a device that is on a local network and in communication with the media device 106. In another implementation, the content 104 may be provided by the media device 106, as the content 104 is stored on the media device 106. In yet another implementation, the content 104 may be provided from a storage device separate from the media device 106. The content 104 may include movies, television series, digital versatile disc (DVD), user-uploaded videos, eBooks, music, audiobooks or a combination thereof. The media device 106 is configured to present the content 104 to a user. In one implementation, the media device 106 may present the content 104 to the user via a display device. The media device 106 may be a set-top box, tablet, smart phone, media player, eBook reader device, computer-based tool, laptop computer, input accessory device, television, and so forth. The media device 106 in this illustration is depicted in a "landscape" mode by way of illustration, and not as a limitation.

At (T=1) 110 the media device 106 receives a user input. In one implementation, the user input may be to pause presentation of the content 104. For example, the user may touch the screen to indicate a pause or use a remote control to indicate the pause. In another example, the user input may be associated with a particular scene ending within the content 104 that indicates the pause. In yet another example, the media device 106 may receive data indicative of presence of a user proximate to the media device 106. In this example, the media device 106 may include a microphone or one or more sensors configured to monitor for the user presence proximate to the media device 106. When the microphone or the one or more sensors cannot detect the presence of a user proximate to the media device 106, the microphone or the one or more sensors may indicate to the media device 106 to pause the presentation of the content 104. In yet another example, the media device 106 may be configured to receive sensor data obtained from the one or more sensors in an environment proximate to the user. In this example, the sensor data is indicative of a noise associated with a sound of knocking on a door or ringing of a doorbell. In yet another implementation, the user input may be associated with a phrase. For example, the phrase may be "shop", which may cause the media device 106 to pause the presentation of the media device 106. In another example, the phrase may be "shop", which may cause the media device 106 to send data indicative of the user input to a merchant server 114, while the media device 106 continues presentation of the content 104.

The media device 106 is configured to send user input data 112 indicative of the user input to pause the presentation of the content 104 to a merchant server 114. In one implementation, the user input data 112 may further be indicative of a point within the content 104 which the presentation of the content 104 was paused.

The merchant server 114, upon receipt of the user input data 112 determines the content presentation index data indicative of a portion within the content 104 at which presentation was suspended. For example, the content presentation index data may include one or more of a content identifier, time stamp, a frame number, or a chapter scene. The merchant server 114 may determine one or more items associated with the portion of the content 104 and send item data 116 separate from the content 104. The item data 116 indicative of the one or more items to the media device 106. The one or more items may comprise goods, services, music, ebooks, audio books, other content, and so forth. The items available for acquisition may include items available for purchase, rental, download, streaming, as promotional items at no or reduced cost, and so forth. For example, the content 104 being presented to the user may be the movie "Burning Sage" and the item data 116 may be indicative of a cowboy hat, cowboy boots, a saddle, and a cowboy shirt.

The media device 106, upon receipt of the item data 116, generates a user interface to depict available items 118 to order. The available items 118 may correspond to one or more items within the portion of the content 104 at which presentation was suspended. In one implementation, the available items 118 may correspond to one or more items within the content 104. For example, as illustrated in FIG. 1, the generated user interface to depict the available items 118 may overlay the paused presentation of the content 104. In this example, the content 104 being presented may be the movie "Burning Sage". The available items 118 for the particular scene of the movie may be the cowboy hat, the saddle, the cowboy boots, and the cowboy shirt. The media device 106 receives a user input indicative of a selection of one or more of the available items 118. For example, the media device 106 may receive a user input indicative of a selection to order the cowboy hat. The media device 106 may send selection data 120 indicative of the selection of one or more of the available items 118 to the merchant server 114. For example, the selection data 120 may indicate that the user has selected to order the cowboy hat.

In other implementations, the available items 118 may be presented in other ways. In one implementation, the generated user interface may be presented on another media device 106. For example, a first media device 106(1) may comprise a television presenting the content 104 while a second media device 106(2) such as a smartphone presents the available items 118. In another example, the single media device 106 may present the content 104 in one window while the available items 118 are displayed in another. In this example, presentation of the content 104 may continue while the user browses the available items 118 or performs other actions such as purchasing one or more of the available items 118.

At (T=2) 122, the merchant server 114 generates order confirmation data 124 using the item specified by the selection data 120. In one implementation, the merchant server 114 at (T=2) 122, upon receipt of the selection data 120 may determine a valid payment method and shipping address associated with the media device 106. The merchant server 114 may generate the order confirmation data 124 using the item specified by the selection data 120, the valid payment method, and the shipping address. For example, the order confirmation data 124 may be an indication that the order is complete. In another example, the order confirmation data 124 may be an indication that the user's selection has been received. The merchant server 114 sends the order confirmation data 124 indicative of the order to the media device 106.

The media device 106 may generate a user interface to depict order confirmation 126. For example, as illustrated in FIG. 1 the generated user interface depicts the order confirmation 126 as an overlay on the paused presentation of the content 104. In this example, the order confirmation 126 may indicate the cowboy hat has been ordered. In another example, the order confirmation 126 may provide a thank you for your order message.

The merchant server 114 is configured to generate order data 128 indicative of a completed order. The merchant server 114 may send an electronic mail (email) confirmation to an email address associated with the media device 106. For example, the email confirmation may include an order number, an indication of the items ordered based on the selection data 120, an indication of an expected delivery date, total cost of item(s) ordered, the shipping address, a billing address or a combination thereof.

At (T=3) 130, the media device 106 receives a user input to resume presentation of the content 104. For example, the user input may be the user touching the screen to indicate resumes the presentation of the content 104. In another example, the user input may be the user pressing a button on a remote control to indicate resume a pause or use a remote control to indicate resumes the presentation of the content 104. In yet another example, the user input may be the presentation of the order confirmation 126, which indicates to the media device 106 to resume presentation of the content 104. In one implementation, the media device 106 may send data indicative of the user input to resume the presentation of the content 104 to the content server 102. As described above, the user input may be the user touching the screen to indicate resumes the presentation of the content 104, which causes the media device 106 to generate the data indicative of the user input and send the data to a service or server, such as the content server 102. The content server 102, upon receipt of the user input, resumes the presentation of the content 104 by sending the content data to the media device 106.

FIGS. 2-6 depict flow diagrams 200, 300, 400, 500, and 600 illustrating a process of providing the item data 116 indicative of one or more items associated with a portion of content. Although the process 200, 300, 400, 500, and 600 are described with reference to the flowchart illustrated in FIGS. 2-6 many other methods performing the acts associated with the process 200, 300, 400, 500, and 600 may be used. For example, the order of the steps may be changed, some of the steps described may be optional, and additional steps may be included. In these diagrams, time increases from top to bottom, such that events occurring at the bottom of the page may occur later than those events depicted at the top of the page.

At 202, the media device 106 generates the user input data 112 indicative of a user input to pause presentation of content 104. The content 104 may include movies, television series, self-published videos, music, audiobooks, eBooks, and so forth. In one implementation, the content 104 may be provided by the content server 102. In another implementation, the content 104 may be provided by a device that is on a local network and in communication with the media device 106. In yet another implementation, the content 104 may be provided by the media device 106, as the content 104 is stored on the media device 106. In another implementation, the content 104 may be provided from a storage device separate from the media device 106. The user input may be the user touching the screen to indicate a pause or use a remote control to indicate the pause. For example, while the user is watching the movie "Burning Sage", the user may wish to order a cowboy hat featuring the likeness of the cowboy hat that a particular character in the movie is wearing. In this example, the user may touch the screen to indicate a pause or user a remote control to indicate the pause.

In one implementation, the user input data 112 may include a particular scene ending within the content 104. For example, the particular scene ending within the content 104 may correspond to the ending of a chapter within a DVD. In another example, the particular scene ending within the content 104 may correspond to a frame that indicates that the particular scene is ending.

In another implementation, the user input data 112 may include input by a user to pause the presentation of the content 104. For example, the input may be the user touching the screen to indicate a pause or use a remote control to indicate the pause.

In yet another implementation, the user input data 112 may include data indicative of presence of a user proximate to the media device 106. For example, the data indicative of the presence of the user proximate to the media device 106 may include the media device 106 including a microphone or one or more sensors configured to monitor for a user presence proximate to the media device 106. When the microphone or the one or more sensors cannot detect the presence of a user proximate to the media device 106, the microphone or the one or more sensors may indicate to the media device to pause the presentation of the content 104.

In another implementation, the user input data 112 may include sensor data obtained from one or more sensors in an environment proximate to the user. For example, the sensor data obtained from one or more sensors in the environment proximate to the user may include sensor data indicative of a noise associated with a sound of knocking on a door or ringing of a doorbell.

In yet another implementation, the user input data 112 is indicative of the user input to request for item data 116 indicative of one or more items in a portion of the content. For example, the user input may be associated with a phrase, such as, "shop", which may cause the media device 106 to pause the presentation of the media device 106. In another example, the phrase may be "shop", which may cause the media device 106 to receive from content/item mapping service 212 the item data 116, while the media device 106 continues presentation of the content 104.

In other implementations, the user may be listening to content 104 such as music or an audiobook. The user input data 112 may be indicative a user input such as a verbal command. The verbal command may be a request for item data 116 indicative of one or more items in a portion of the content 104. For example, the verbal command may be associated with a phrase, such as "shop", which may cause the media device 106 to pause the presentation of the music or the audiobook. The media device 106 may receive from a content/item mapping service 212 the item data 116 indicative of the one or more items in the portion of the music or the audiobook. The media device 106 may be configured to recite the items indicated by the item data 116 to the user. For example, the content 104 being presented to the user may be the audiobook "Burning Sage" and the item data 116 may be indicative of a cowboy hat, cowboy boots, a saddle, and a cowboy shirt. In this example, the media device 106 may be configured to output audio such as computer generated speech that says aloud to the user that the available items 118 are a cowboy hat, cowboy boots, a saddle, and a cowboy shirt.

In another implementation, the user may be listening to content 104 such as music or an audiobook. The user input data 112 may be indicative of a user input such as a verbal command. The verbal command may be a request for item data 116 indicative of one or more items in a portion of the content 104. For example, the media device 106 may be presenting to the user the audiobook "Burning Sage" and describing cowboy boots. The user may provide the user input to the media device 106 that the user would like to purchase the cowboy boots the author just described. The user input may be a verbal command, such as, "purchase cowboy boots". The user input may include the user touching the media device 106, such as a button or icon on the media device 106, hand gestures, motion of an input device, and so forth. The media device 106 may be configured to generate the selection data 120 based on the user input. The media device 106 may send the selection data 120 to the content/item mapping service 212. In this example, the media device 106 continues the presentation of the content 104 continues, while the user provides the user input to purchase the cowboy boots.

In other implementations, the user may be watching the content 104. The user input data 112 may be indicative a user input such as a verbal command. The verbal command may be a request for item data 116 indicative of one or more items in a portion of the content 104. For example, the verbal command may be associated with a phrase, such as "shop", which may cause the media device 106 to receive from the content/item mapping service 212 the item data 116. The item data 116 may be indicative of the one or more items in the portion of the content 104. The media device 106 may be configured to depict the items indicated by the item data 116, while the media device 106 continues the presentation of the content 104. For example, the content 104 being presented to the user may be the movie "Burning Sage" and the item data 116 may be indicative of a cowboy hat, cowboy boots, a saddle, and a cowboy shirt. In this example, the media device 106 may be configured to present to the user the cowboy hat, the cowboy boots, the saddle, and the cowboy shirt as described above, while the presentation of the movie "Burning Sage" continues.

The media device 106 is configured to send the user input data 112 to a user interface service 204 or optionally may send the user input data 112 to an order processing service 210. In one implementation, at 206, the user interface service 204 may generate a request for the item data 116 indicative of the one or more items in the portion of the content 104. The user interface service 204 may determine the portion of the content 104 by content presentation index data that may be either included in the user input data 112 or was sent from the media device 106 in addition to the user input data 112. The content presentation index data may include one or more of a content identifier, time stamp, a frame number, or a chapter scene. The user interface service 204 may be configured to send items in content request 208 to the order processing service 210 or the content/item mapping service 212.

In one implementation, the items in content request 208 may include a content identifier indicative of the content 104 being presented. For example, the content identifier may indicate the content, such as "Burning Sage" or the type of content, such as movies, television series, audiobook, music, etc.

In another implementation, the items in content request 208 may include the content presentation index data. The content presentation index data may include one or more of a content identifier, time stamp, a frame number, or a chapter scene.

In yet another implementation, the items in content request 208 may include user account information associated with the presentation of the content 104 by the media device 106. For example, the user account information may include information such as, user preferences, account status, age of the account, shipping address, billing address, payment options and so forth.

In another implementation, the items in content request 208 may include media device information indicative of one or more characteristics of the media device 106 used to present the content 104. For example, the media device information may include information such as, the media device 106 specifications, connection speed, type of network connection, operating system (OS) version of the media device 106, device software version and so forth. In one implementation, the media device information may be used to generate different user interfaces based on the media device 106 specifications, connection speed, type of network connection, OS version of the media device 106, device software version or a combination thereof. For example, a media device 106 that has a high connection speed and a new OS version may have a user interface generated, such as, user interface 904 as described in FIG. 9. In another example, a media device 106 with a poor connection speed or has an older OS version may have a more simplified user interface, such as, user interface 912 as described in FIG. 9.

The user interface service 204, in one implementation, may generate a second request for item data 116 indicative of the one or more items in the entire content 104. In another implementation, the user interface service 204 may generate the request for item data 116 indicative of the one or more items in the portion of the content 104 and in the entire content 104 or related thereto.

In another implementation, at 206, the order processing service 210 may generate the request for the item data 116 indicative of the one or more items in the portion of the content 104. The order processing service 210 may be configured to send the items in content request 208 to the content/item mapping service 212. Furthermore, the order processing service 210 may be configured to generate the second request for item data 116 indicative of the one or more items in the entire content 104 or generate a request for item data 116 indicative of the one or more items in the portion of the content 104 and in the entire content 104 or related thereto.

In another implementation, at 206 the order processing service 210 may generate the request for the item data 116 indicative of the one or more items in a second portion of the content 104. The second portion of the content 104 may be indicative of a future time stamp, a future frame number, or a next chapter scene. The order processing service 210 may generate the request periodically to enable the media device 106 to depict the items indicated by the item data 116 in real time. For example, the order processing service 210 may generate a request every five minutes for the item data 116 indicative of the one or more items to be presented in the future of the content 104. In this example, the media device 106 may be presenting to the user the movie "Burning Sage". The movie may in the process of being presented using the media device 106 and is currently showing content at the five (5) minute elapsed time in the presentation since beginning playback. The order processing service 210 may generate a request for the item data 116 indicative of the one or more items that are depicted in the content 104 between the ten (10) minute and the fifteen (15) minute elapsed time. Furthermore, once the movie reaches the 10 minute elapsed time the order processing service 210 may generate a second request for the item data 116. The second request for the item data 116 may be indicative of the one or more items that are present between the fifteen (15) minute elapsed time and the twenty (20) minute elapsed time. This process of generating requests for the item data 116 continues until the presentation of the content 104 reaches completion. In another example, the media device 106 may be presenting to the user the first chapter of the movie "Burning Sage". The order processing service 210 may generate a request for the item data 116 indicative of the one or more items that are present in the second chapter of the movie "Burning Sage". In this example, the process of generating requests for the item data 116 continues until the presentation of the content 104 reaches completion.

At 214, the content/item mapping service 212 is configured to determine the item data 116 indicative of one or more items associated with the portion of the content 104. In one implementation, at 220, the content/item mapping service 212 in determining the item data 116 indicative of one or more items may generate a product list indicative of item identifiers of the one or more items associated with the content presentation index data for the portion of the content 104. For example, the product list for "Burning Sage" may include the cowboy hat, the saddle, the cowboy boots, and the cowboy shirt. Each of these items may be associated with an item identifier. For example, the cowboy hat may have an item identifier of "A1", the saddle may have an item identifier of "A2", the cowboy boots may have an item identifier of "A3", and the cowboy shirt may have an item identifier of "A4".

In another implementation, the content/item mapping service 212 in determining the item data 116 indicative of one or more items may generate a product list indicative of item identifiers of the one or more items associated with the content presentation index data for the entire content 104. For example, the product list for "Burning Sage" may include the cowboy hat, the saddle, the cowboy boots, the cowboy shirt, a toy pistol, and so forth. Each of these items may be associated with an item identifier. As described above, the cowboy hat may have an item identifier of "A1", the saddle may have an item identifier of "A2", the cowboy boots may have an item identifier of "A3", and the cowboy shirt may have an item identifier of "A4". The toy pistol may have an item identifier of "B1".

In yet another implementation, the content/item mapping service 212 may generate a product list indicative of item identifiers of the one or more items associated with the content presentation index data for the portion of the content 104 and the entire content 104. The product list may be configured to have the one or more items associated with the content presentation index data for the portion of the content 104 to be arranged first on the product list with the remaining one or more items to follow. For example, the product list for "Burning Sage" may include the cowboy hat, the saddle, the cowboy boots, the cowboy shirt, a toy pistol, and so forth. Each of these items may be associated with an item identifier. As described above, the cowboy hat may have an item identifier of "A1", the saddle may have an item identifier of "A2", the cowboy boots may have an item identifier of "A3", the cowboy shirt may have an item identifier of "A4", and the toy pistol may have an item identifier of "B1". The product list may list the cowboy hat, the saddle, the cowboy boots, and the cowboy shirt first as they are currently present in the portion of the content 104 and items such as the toy pistol and so forth follow as they appear elsewhere within the content 104.

Figure 2:
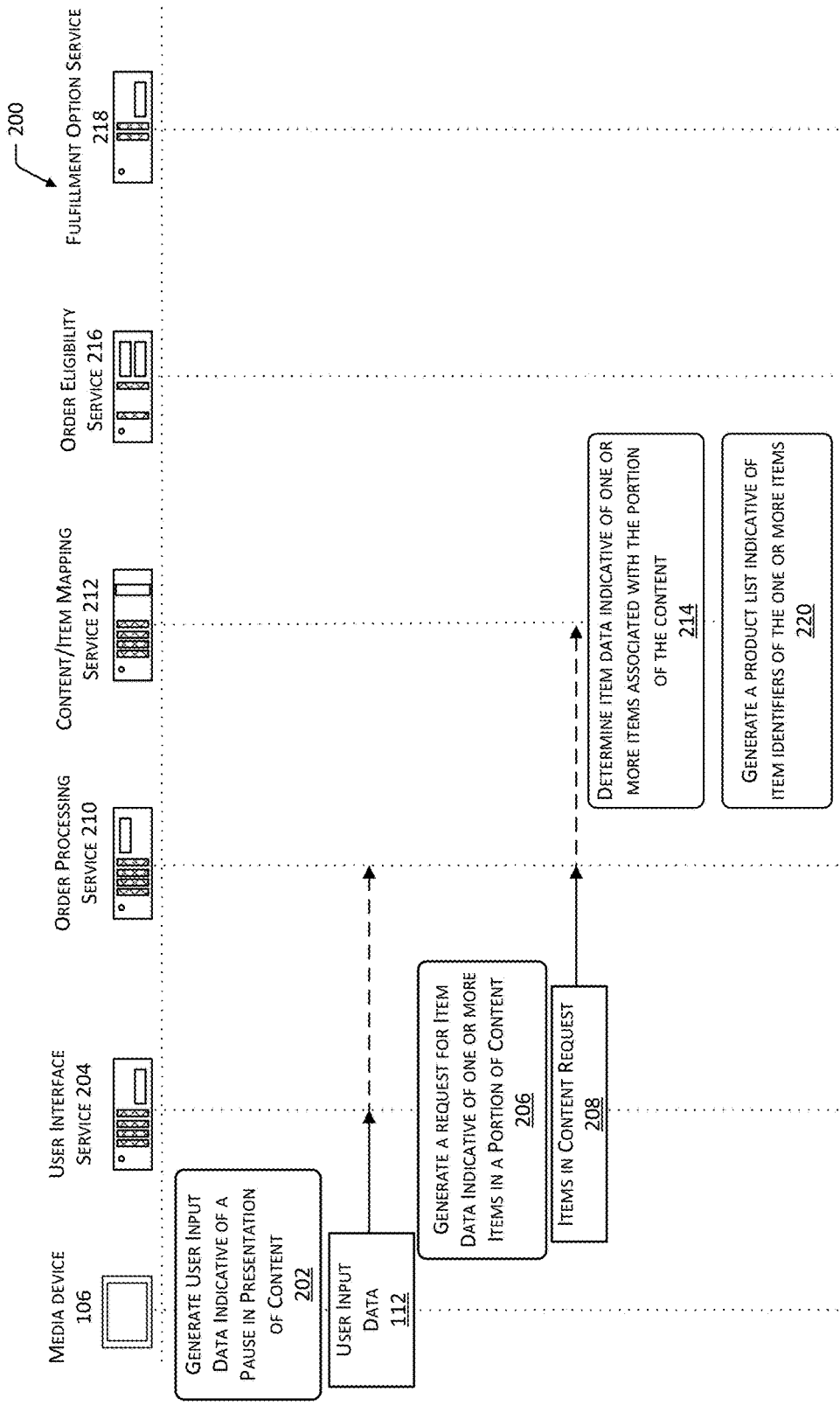
FIGS. 2, 3, 4, 5, and 6 depict a flow diagram illustrating a process of providing item data indicative of one or more items associated with a portion of content.
Figure 3:
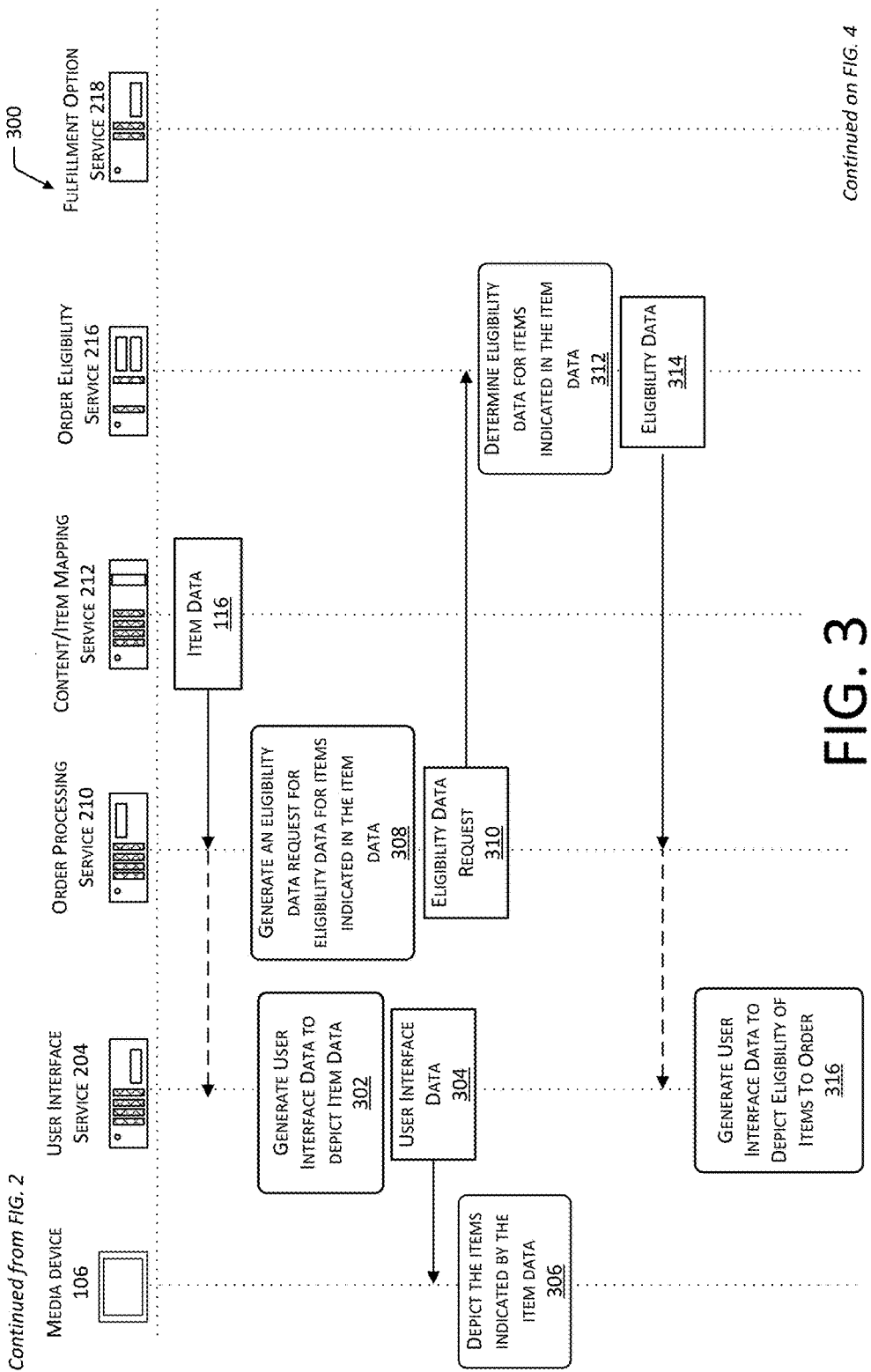

FIG. 3 depicts the continuation of flow diagram 200 from FIG. 2 to the flow diagram 300. The content/item mapping service 212 may be configured to send the item data 116 separate from the content 104 to the order processing service 210 or the user interface service 204. At 302, the user interface service 204 is configured to generate user interface data 304 to depict the item data 116. The user interface data 304 may be indicative of a layout that is overlaid on the presentation of the content 104. The user interface service 204 may be configured to send the user interface data 304 to the media device 106.

At 306, the media device 106 may be configured to depict the items indicated by the item data 116. For example, as illustrated in FIG. 1, the media device 106 depicts the available items 118 as an overlay on the paused presentation of the content 104. The available items 118 for the particular scene of "Burning Sage" may be the cowboy hat, the saddle, the cowboy boots, and the cowboy shirt.

In some implementations, presentation of the content 104 may continue while the user interface is being presented. At 306, the media device 106 may be configured to depict the items indicated by the item data 116, while the media device 106 continues the presentation of the content 104. For example, the media device 106 may be configured to depict a user interface indicative of the available items 118 as an overlay during presentation of the content 104. In one implementation, the overlay may be the user interface being presented a greater layer along a Z axis relative to a layer used to present the content 104, thus appearing to be above or on top of the presentation. For example, as shown in FIG. 1, the media device 106 may be presenting the movie "Burning Sage" to the user. In this example, as shown in FIG. 1, the user interface may be located towards the bottom of the display of the media device 106 covering only a portion of the content 104. In another example, the user interface may be located towards the top or the sides of the display of the media device 106. In another example, the available items 118 may change during the presentation of the content 104. For example, during the presentation of the movie "Burning Sage" there may be a scene change. The scene change may be indicative of a change in place being depicted, a DVD chapter ending, a different point of view of the camera, and so forth. The media device 106 may be configured to receive from the user interface service 204, prior to the scene change, user interface data 304 to depict availability of items to order. The user interface service 204, the order processing service 210, or another service may be configured to determine that there has been a scene change in the movie "Burning Sage" and provide a user interface to the media device 106. For example, the scene data may be included as metadata associated with the content 104. The media device 106 may be configured to depict the user interface indicative of the available items 118 for the scene change. The available items 118 in the scene change may include furniture, glassware, digital content, such as a particular song playing in the scene, and a promotional item or free item, such as, beef jerky or a coupon.

At 308, the order processing service 210 is configured to generate an eligibility data request 310 for items indicated in the item data 116. In one implementation, the request may include the product list indicative of item identifiers of the one or more items associated with the content presentation index data for the portion of the content 104. For example, the eligibility data request 310 may include the products list for "Burning Sage" requesting the availability of the cowboy hat, the saddle, the cowboy boots, and the cowboy shirt. In another implementation, the request may include the product list indicative of item identifiers of the one or more items associated with the content presentation index data for the entire content 104. For example, the eligibility data request 310 may include the products list for "Burning Sage" requesting the availability of the cowboy hat, the saddle, the cowboy boots, the cowboy shirt, the toy pistol and so forth. In yet another implementation, the request may include the product list indicative of item identifiers of the one or more items associated with the content presentation index data for the portion of the content 104 and the entire content 104 or related thereto. The order processing unit 210 is further configured to send the eligibility data request 310 to an order eligibility service 216. In another example, the eligibility data request 310 may include information, such as, customer settings, membership type, product type, and so forth.

At 312, the order eligibility service 216 is configured to determine eligibility data 314 for items indicated in the item data 116. In one implementation, the eligibility data 314 may be indicative of the one or more items included in the item data 116 that are available for immediate purchase. In another implementation, the eligibility data 314 may be indicative of an acquisition option for each of the one or more items included in the item data 116. The acquisition options may include a purchase now option, an add to basket option, a lease option, a rent option, an add to wishlist option, or a combination thereof. The order eligibility service 216 is further configured to send the eligibility data 314 to the order processing service 210 or to the user interface service 204. In another implementation, the eligibility data 314 may be indicative of the one or more items included in the item data 116 that are eligible for acquisition. Eligibility may be based on one or more factors, such as if the item is available for immediate purchase, if the item is available for immediate shipment, user settings or preferences, membership type of a user, type of product, and so forth. For example, a user may have purchased a membership that allows for free or discounted shipping costs. Based on this membership type, the user may be able to receive priority shipping on items that are currently in stock. Given this membership type, the eligibility data 314 may indicate in the item data 116 those items that are currently in stock as being available for purchase.

At 316, the user interface service 204 is configured to generate user interface data 318 to depict availability or eligibility of items to order. Further, the user interface service 204 may be configured to send the user interface data 318 to the media device 106.

Figure 4:
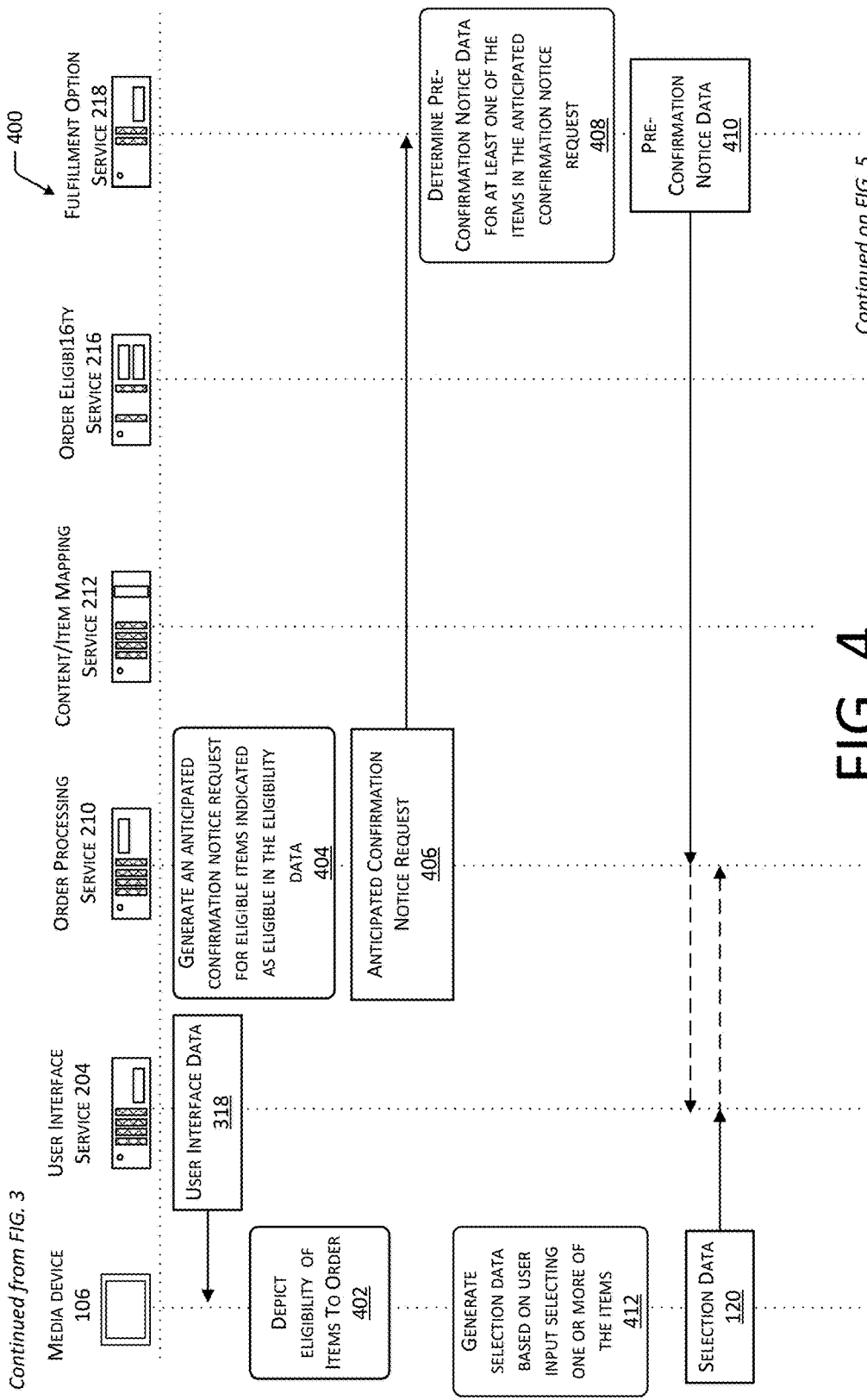

FIG. 4 depicts the continuation of flow diagram 300 from FIG. 3 to the flow diagram 400. At 402, the media device 106 is configured to depict the availability or eligibility of items to order. The depiction is overlaid on the paused presentation of the content 104. Further, the depiction of the availability may be represented by an icon. For example, when the availability for the item is for immediate purchase. The icon may indicate Buy Now, Buy Now with 1-Click, a finger with a clicking or selection action, or a combination thereof. In another example, availability icon may include, an add to cart icon, a rent icon, a lease icon, an add to wishlist icon, or a combination thereof. For example, with reference to FIG. 1, the cowboy hat may be available for immediate purchase. In this example, the media device 106 may depict an icon in the user interface near the cowboy hat which indicates that the cowboy hat is available for immediate purchase. As another example, with reference to FIG. 1, the media device 106 may depict a rent icon in the user interface that is near the saddle, an add to cart icon in the user face near the cowboy boots, and an add to wishlist icon near the cowboy shirt.

At 404, the order processing service 210 is configured to generate an anticipated confirmation notice request 406 for available items 118 indicated as available or eligible in the eligibility data 314. In one implementation, the anticipated confirmation notice request 406 may be for the available or eligible items that are indicated as available for immediate purchase. For example, with reference to the "Burning Sage" examples, the cowboy hat may be available for immediate purchase. In this example, the order processing service 210 may generate the anticipated confirmation notice request 406 for the cowboy hat. In another implementation, the anticipated confirmation notice request 406 may be for all available or eligible items within the portion of the content 104. For example, continuing the earlier "Burning Sage" examples, the order processing service 210 may generate the anticipated confirmation notice request 406 for the cowboy hat, the saddle, the cowboy boots, and the cowboy shirt. In yet another implementation, the anticipated confirmation notice request 406 may be for the available items 118 within the entire content 104. For example, the order processing service 210 may generate the anticipated confirmation notice request 406 for the cowboy hat, the saddle, the cowboy boots, the cowboy shirt, and so forth. The order processing service 210 is further configured to send the anticipated confirmation notice request 406 to a fulfillment option service 218.

At 408, the fulfillment option service 218 is configured to determine pre-confirmation notice data 410 for at least one of the items in the anticipated confirmation notice request 406. The determining of the pre-confirmation notice data 410 may include preloading the order of the one or more items in the portion of the content 104. In one implementation, the fulfillment option service 218 preloads the order of the one or more items for items that are available or eligible for immediate purchase. The availability for immediate purchase may be dependent on shipment availability. For example, with reference to the "Burning Sage" example, the cowboy hat may be available for immediate shipment. In this example, the fulfillment option service 218 may generate the pre-confirmation notice data 410 for the cowboy hat. In another example, multiple items may be available or eligible for immediate shipment, such as the cowboy hat, the saddle, and the cowboy shirt. In this example, the fulfillment option service 218 may generate the pre-confirmation notice data 410 for orders involving the cowboy hat, the saddle, and the cowboy shirt. The fulfillment option service 218 may be configured to send the pre-confirmation notice data 410 to the order processing service 210 or the user interface service 204. The pre-confirmation notice data 410 may include order confirmations for each available item indicated as available or eligible in the eligibility data 314. For example, the pre-confirmation notice data 410 may include separate order confirmations for the cowboy hat, the saddle, the cowboy boots, and the cowboy shirt.

At 412, the media device 106 is configured to generate the selection data 120 based on a user input selecting one or more of the items. As described above, the selection data 120 may be indicative of the selection of one or more of the available items 118. For example, as illustrated in FIG. 1, the media device 106 may receive a user input indicative of a selection to order the cowboy hat. The media device 106 may generate the selection data 120 indicative of the selection of the cowboy hat and send the selection data 120 to the user interface service 204 or the order processing service 210 as illustrated in FIG. 4.

Figure 5:
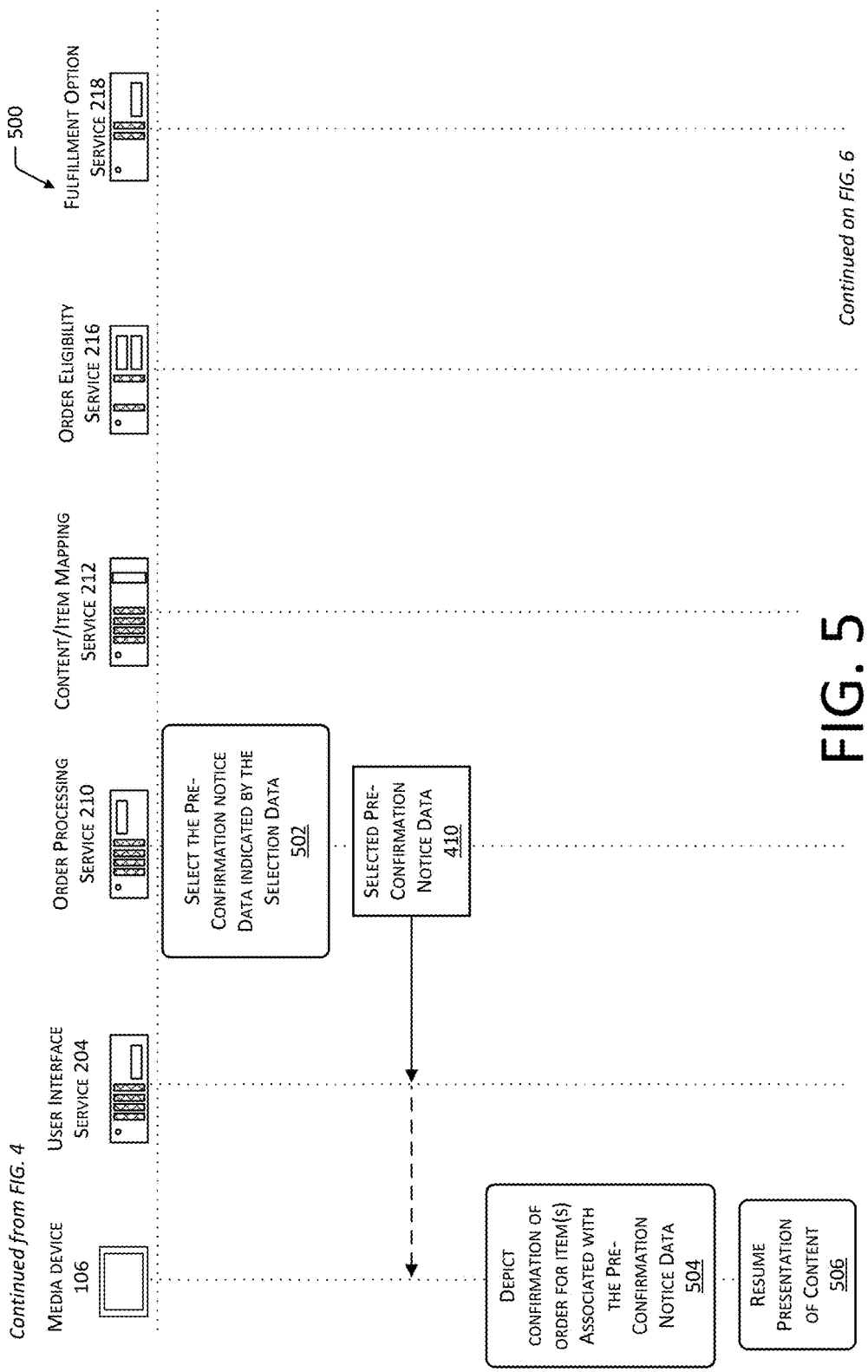

FIG. 5 depicts the continuation of flow diagram 400 from FIG. 4 to the flow diagram 500. At 502, the order processing service 210 is configured to select the pre-confirmation notice data 410 indicated by the selection data 120. For example, the selection data 120 indicates that the selected item was the cowboy hat in "Burning Sage." In this example, the order processing service 210 selects the pre-confirmation notice data 410 that is associated with the cowboy hat. The order processing service 210 may be configured to send the selected pre-confirmation notice data 410 to the user interface service 204 or the media device 106. The order processing service 210 by having the pre-confirmation notice data 410 preloaded enables the user to resume presentation of the content 104, while the order processing service 210 completes the order of the one or more selected items. This leads to a seamless, frustration-free, and zero latency user experience.

At 504, the media device 106 is configured to depict confirmation of an order for item(s) associated with the pre-confirmation notice data 410. As described above, with respect to FIG. 1, the depiction of the confirmation of the order is overlaid on the paused presentation of the content 104. The confirmation of the order may indicate that the selected item(s) have been ordered.

At 506, the media device 106 is configured to resume presentation of the content 104. In one implementation, the media device 106 may receive a user input to resume presentation of the content 104. For example, the user input may be the user touching the screen to indicate resumes the presentation of the content 104. In another example, the user input may be the user pressing a button on a remote control to indicate resume a pause or use a remote control to indicate resumes the presentation of the content 104. The media device 106 may send data indicative of the user input to resume the presentation of the content 104 to the user interface service 204 or to the merchant server 114. The media device 106 may be configured to resume receiving the content 104 from the user interface service 204 or the merchant server 114 and present the content 104 using the display device. In another implementation, the media device 106 may resume presentation of the content 104 in response to receiving the pre-confirmation notice data 410 and depicting the confirmation of the order to the user using the display device.

Figure 6:
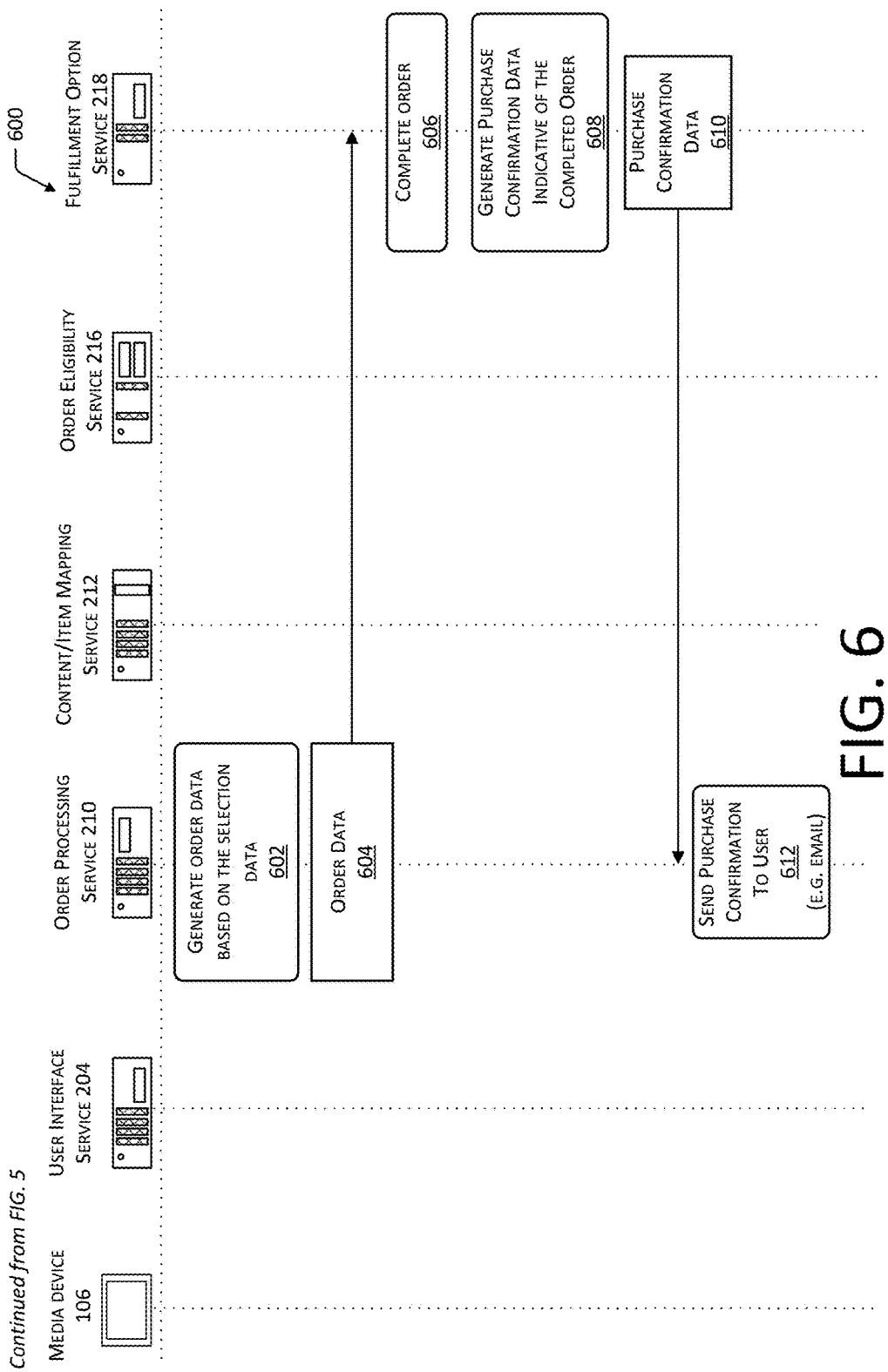

FIG. 6 depicts the continuation of flow diagram 500 from FIG. 5 to the flow diagram 600. At 602, the order processing service 210 is configured to generate order data 604 based on the selection data 120. In one implementation, the order data 604 may include the item(s) specified by the selection data 120, the valid payment method, and the shipping address. In another implementation, the order data 604 may include the order processing service 210 determining a payment method and a shipping address associated with the media device 106. In yet another implementation, the order data 604 may include the one or more items specified by the selection data 120, and user account information associated with the presentation of the content 104 by the media device 106. The order processing service 210 is further configured to send the order data 604 to the fulfillment option service 218.

At 606, the fulfillment option service 218 is configured to complete the order based on the order data 604. In one implementation, the fulfillment option service 218 may complete the order by determining a payment method and a shipping address associated with the media device 106 and sending a notification to a warehouse facility that indicates the one or more items specified by the selection data 120 and the shipping address associated with the media device 106. In another implementation, the media device 106 may determine the user account information associated with the presentation of the content 104 by the media device 106 and send a notification to the warehouse facility that indicates the one or more items specified by the selection data 120 and the shipping address based on the user account information associated with the media device 106.

At 608, the fulfillment option service 218 is configured to generate purchase confirmation data 610 indicative of the complete order. The fulfillment option service 218 may send the purchase confirmation data 610 to the order processing service 210.

At 612, the order processing service 210 is configured to send a purchase confirmation to the user. In one implementation, the order processing service 210 may send the purchase confirmation via email to the user. In another implementation, the order processing service 210 may send the purchase confirmation via text message to the user. The purchase confirmation may include an order number, an indication of the items ordered based on the selection data 120, an indication of an expected delivery date, total cost of item(s) ordered, the shipping address, a billing address or a combination thereof.

Figure 7:
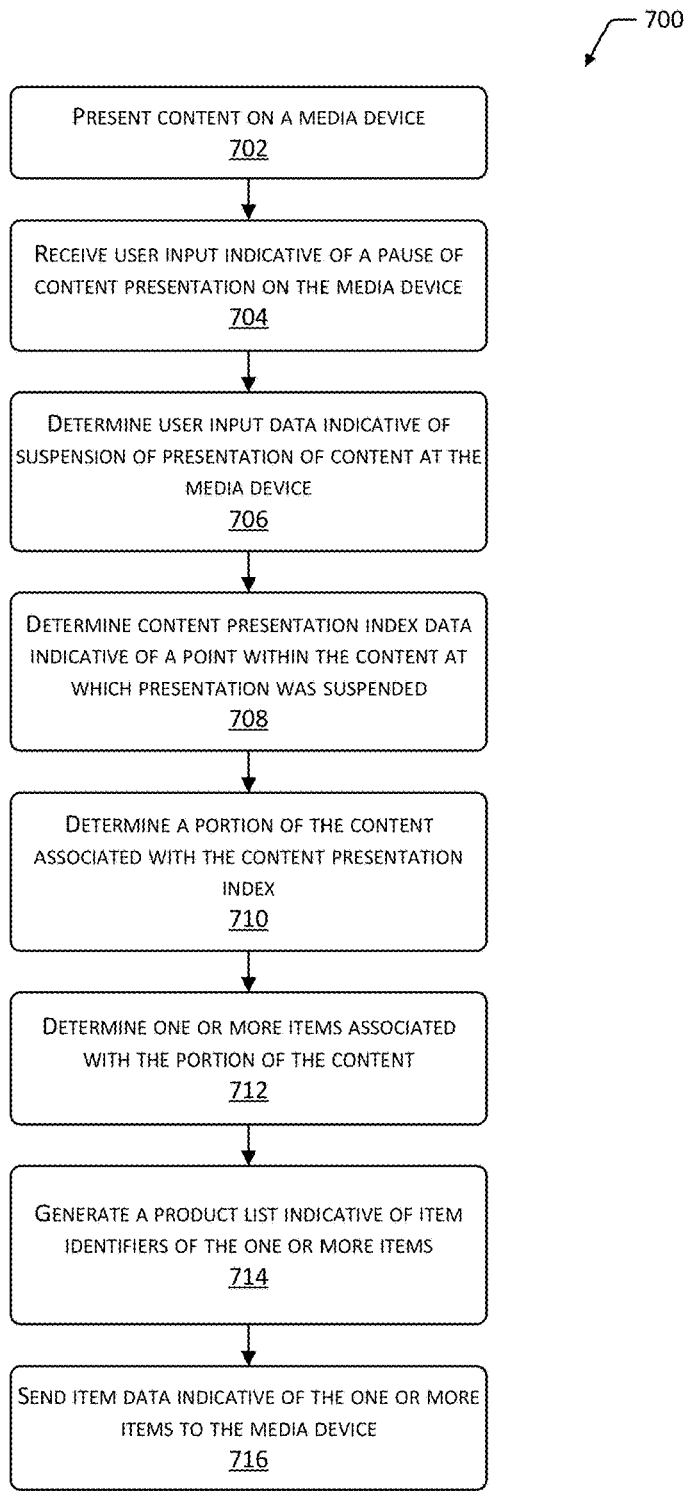
FIG. 7 is a flow diagram of a process of processing input data to determine item data indicative of one or more items associated with a portion of content.

FIG. 7 is a flow diagram of a process 700 of processing input data to determine the item data 116 indicative of one or more items associated with a portion of the content 104. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the content server 102 may be configured to provide the content 104 to the media device 106. In another implementation, the content 104 may be provided by a device that is on a local network and in communication with the media device 106. In yet another implementation, the content 104 may be provided by the media device 106, as the content 104 is stored on the media device. In another implementation, the content 104 may be provided from a storage device separate from the media device 106. The media device 106 may be configured to present the content 104 to the user. In one implementation, the media device 106 may include a display device configured to present the content 104 to the user.

At 704, the media device 106 may be configured to receive the user input indicative of a pause of content presentation on the media device 106. For example, the user may touch the screen to indicate a pause or use a remote control to indicate the pause. In another example, the user input may be associated with a particular scene ending within the content 104 that indicates the pause. In yet another example, the media device 106 may receive data indicative of presence of a user proximate to the media device 106. In this example, the media device 106 may include a microphone or one or more sensors configured to monitor for the user presence proximate to the media device 106. When the microphone or the one or more sensors cannot detect the presence of a user proximate to the media device 106, the microphone or the one or more sensors may indicate to the media device 106 to pause the presentation of the content 104. In yet another example, the media device 106 may be configured to receive sensor data obtained from the one or more sensors in an environment proximate to the user. In this example, the sensor data is indicative of a noise associated with a sound of knocking on a door or ringing of a doorbell.

At 706, the media device 106 may be configured to determine user input data 112 indicative of the suspension of presentation of the content 104. In one implementation, the user input data 112 may correspond to trick play data. In another implementation, the user input data 112 may correspond to a user input, as described above. The media device 106 may determine the user input data 112 based on the user input, as described above. The media device 106 may be configured to send a request that includes the user input data 112 to the merchant server 114, the user interface service 204, the order processing service 210 or a combination thereof. The request may be a data network call. For example, an application or service executing on the media device 106 may utilize an application programming interface (API) to send data to one or more services.

At 708, the merchant server 114, the user interface service 204, the order processing service 210 or a combination thereof may determine the content presentation index data indicative of the point within the content 104 at which presentation was suspended. The content presentation index data may include one or more of a content identifier, time stamp, a frame number, or a chapter scene. The point within the content 104 may correspond to a period of time that may include a specified period of time prior to the point at which the presentation was suspended.

At 710, the merchant server 114, the user interface service 204, the order processing service 210 or a combination thereof may determine the portion of the content 104 associated with the content presentation index. The portion of the content 104 may be determined based on the one or more content identifiers, the time stamp, the frame number, the chapter scene or a combination thereof, as described above.

At 712, the merchant server 114 or the order processing service 210 may determine one or more items associated with the portion of the content 104. In one implementation, the merchant server 114 or the order processing service 210 may generate a request to a service for the item data 116 within the period of time of the content 104. The request may be a data network call to the service. The merchant server 114 or the order processing service 210 may receive, from the service, the item data 116 comprising the product list indicative of item identifiers of the one or more items associated with the content presentation index data for the period of time. In one implementation, the service may correspond to the content/item mapping service 212. The content/item mapping service 212 may determine the one or more items associated with the portion of the content 104 by determining the item data 116 indicative of one or more items.

At 714, the content/item mapping service 212 may generate the product list indicative of item identifiers of the one or more items associated with the content presentation index data for the portion of the content 104, the entire content 104, or a combination thereof. For example, the product list for "Burning Sage" may include the cowboy hat, the saddle, the cowboy boots, and the cowboy shirt. Each of these items may be associated with an item identifier. For example, the cowboy hat may have an item identifier of "A1", the saddle may have an item identifier of "A2", the cowboy boots may have an item identifier of "A3", and the cowboy shirt may have an item identifier of "A4". In another example, the product list for "Burning Sage" may include the cowboy hat, the saddle, the cowboy boots, the cowboy shirt, a toy pistol, and so forth. Each of these items may be associated with an item identifier. As described above, the cowboy hat may have an item identifier of "A1", the saddle may have an item identifier of "A2", the cowboy boots may have an item identifier of "A3", and the cowboy shirt may have an item identifier of "A4". The toy pistol may have an item identifier of "B1". In the implementation, where the product list includes item identifiers associated with the portion of the content and the entire content, the content/item mapping service 212 may arrange the product list to have listed first the one or more items associated with the content presentation index data for the portion of the content 104 and have the remaining one or more items for the entire content to follow. For example, the product list for "Burning Sage" may include the cowboy hat, the saddle, the cowboy boots, the cowboy shirt, a toy pistol, and so forth. Each of these items may be associated with an item identifier. As described above, the cowboy hat may have an item identifier of "A1", the saddle may have an item identifier of "A2", the cowboy boots may have an item identifier of "A3", the cowboy shirt may have an item identifier of "A4", and the toy pistol may have an item identifier of "B1". The product list may list the cowboy hat, the saddle, the cowboy boots, and the cowboy shirt first as they are currently present in the portion of the content 104 and items such as the toy pistol and so forth follow as they appear elsewhere within the content 104.

At 716, the merchant server 114 or the order processing service 210 may send the item data 116 separate from the content 104 to the media device 106. The media device 106 upon receiving the item data 116 may generate a user interface to depict the available items 118 to order. The available items 118 may correspond to the one or more items within the portion of the content 104 at which presentation was suspended. For example, as illustrated in FIG. 1, the media device 106 depicts the available items 118 as an overlay on the paused presentation of the content 104. The available items 118 for the particular scene of "Burning Sage" may be the cowboy hat, the saddle, the cowboy boots, and the cowboy shirt. The media device 106 may receive a user input indicative of a selection of one or more of the available items 118. For example, as illustrated in FIG. 1, the media device 106 may receive a user input indicative of a selection to order the cowboy hat. The media device 106 may send the selection data 120 indicative of the selection of one or more of the available items 118 to the merchant server 114 or the order processing service 210 where the order for the one or more selected items is completed as described above.

Figure 8:
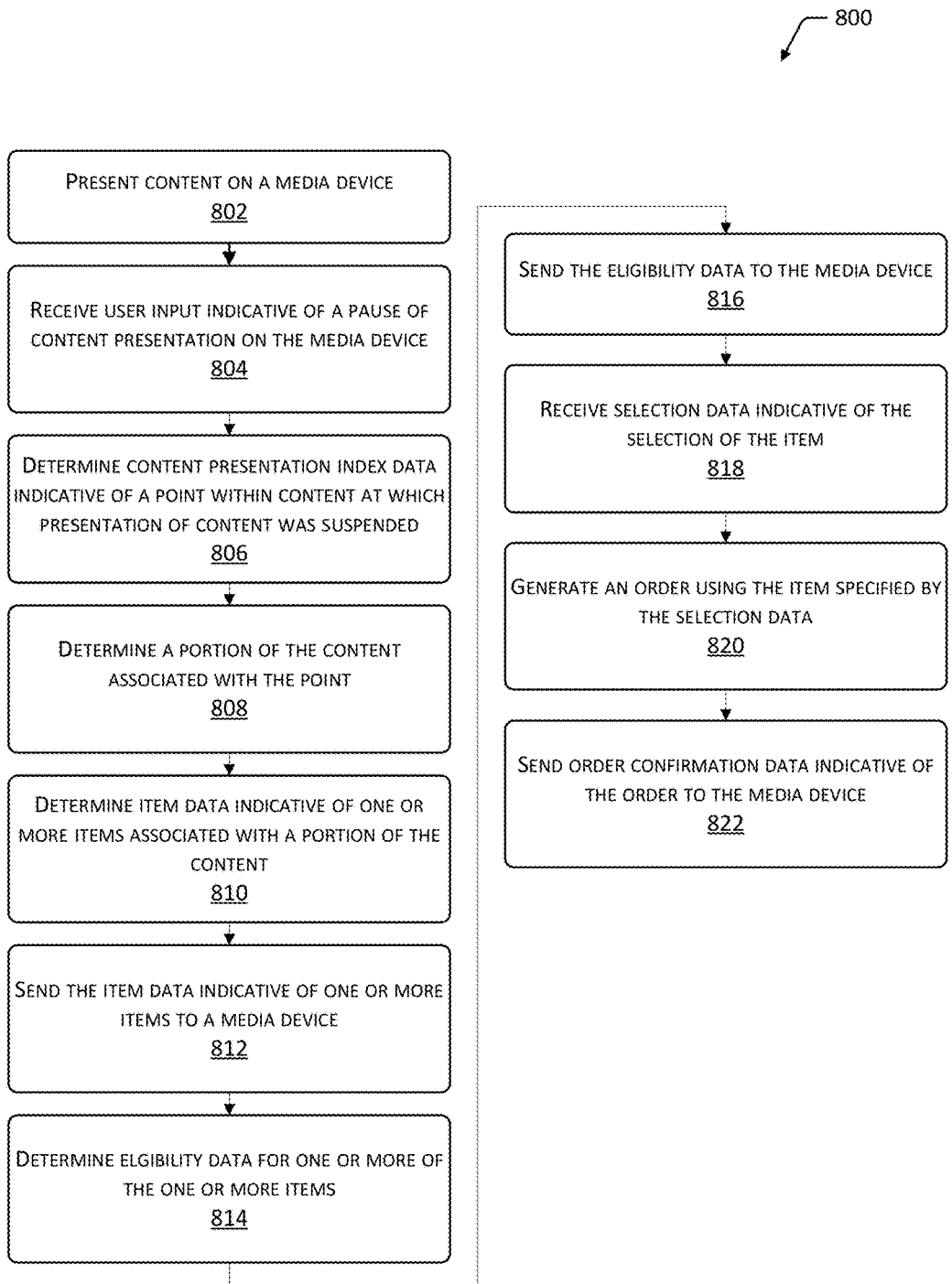
FIG. 8 is a flow diagram of a process of processing input data to determine item data and availability data indicative of one or more items associated with a portion of content.

FIG. 8 is a flow diagram of a process 800 of processing input data to determine the item data 116 indicative of one or more items associated with the portion of the content 104. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the content server 102 may be configured to provide the content 104 to the media device 106. In another implementation, the content 104 may be provided by a device that is on a local network and in communication with the media device 106. In yet another implementation, the content 104 may be stored on the media device 106. In another implementation, the content 104 may be provided from a storage device separate from the media device 106. The media device 106 may be configured to present the content 104 to the user. In one implementation, the media device 106 may include the display device configured to present the content 104 to the user.

At 804, the media device 106 may be configured to receive the user input indicative of a pause of the content presentation on the media device 106. For example, the user may touch the screen to indicate a pause or use a remote control to indicate the pause. In another example, the user input may be associated with a particular scene ending within the content 104 that indicates the pause. In yet another example, the media device 106 may receive data indicative of presence of a user proximate to the media device 106. In this example, the media device 106 may include a microphone or one or more sensors configured to monitor for the user presence proximate to the media device 106. When the microphone or the one or more sensors cannot detect the presence of a user proximate to the media device 106, the microphone or the one or more sensors may indicate to the media device 106 to pause the presentation of the content 104. In yet another example, the media device 106 may be configured to receive sensor data obtained from the one or more sensors in an environment proximate to the user. In this example, the sensor data is indicative of a noise associated with a sound of knocking on a door or ringing of a doorbell. The media device 106 may generate the user input data 112 indicative of the user input to pause the presentation of the content 104 to the merchant server 114, the user interface service 204 or the order processing service 210.

At 806, the merchant server 114, the user interface service 204, the order processing service 210 or a combination thereof may determine the content presentation index data indicative of the point within the content 104 at which presentation was suspended. The content presentation index data may include one or more of a content identifier, time stamp, a frame number, or a chapter scene. As described above, the point within the content 104 may correspond to the period of time that may include a specified period of time prior to the point at which the presentation was suspended.

At 808, the merchant server 114, the user interface service 204, the order processing service 210 or a combination thereof may determine the portion of the content 104 associated with the point. In one implementation, a service call to the content server 102 or a service may be sent for determining the portion of the content 104. The service call may include the user input data 112. The merchant server 114, the user interface service 204, or the order processing service 210 may receive from the content server 102 and the service data indicative of the portion of the content 104. The data may be associated with the one or more content identifiers, the time stamp, the frame number, the chapter scene or a combination thereof.

At 810, the merchant server 114, or the order processing service 210 may determine the item data 116 indicative of the one or more items associated with the portion of the content. In one implementation, the content/item mapping service 212 in determining the item data 116 indicative of one or more items may generate a product list indicative of item identifiers of the one or more items associated with the content presentation index data for the portion of the content 104. For example, the product list for "Burning Sage" may include the cowboy hat, the saddle, the cowboy boots, and the cowboy shirt. Each of these items may be associated with an item identifier. For example, the cowboy hat may have an item identifier of "A1", the saddle may have an item identifier of "A2", the cowboy boots may have an item identifier of "A3", and the cowboy shirt may have an item identifier of "A4".

In another implementation, the content/item mapping service 212 in determining the item data 116 indicative of one or more items may generate a product list indicative of item identifiers of the one or more items associated with the content presentation index data for the entire content 104. For example, the product list for "Burning Sage" may include the cowboy hat, the saddle, the cowboy boots, the cowboy shirt, a toy pistol, and so forth. Each of these items may be associated with an item identifier. As described above, the cowboy hat may have an item identifier of "A1", the saddle may have an item identifier of "A2", the cowboy boots may have an item identifier of "A3", and the cowboy shirt may have an item identifier of "A4". The toy pistol may have an item identifier of "B1".

In yet another implementation, the content/item mapping service 212 may generate a product list indicative of item identifiers of the one or more items associated with the content presentation index data for the portion of the content 104 and the entire content 104. The product list may be configured to have the one or more items associated with the content presentation index data for the portion of the content 104 to be arranged first on the product list with the remaining one or more items to follow. For example, the product list for "Burning Sage" may include the cowboy hat, the saddle, the cowboy boots, the cowboy shirt, a toy pistol, and so forth. Each of these items may be associated with an item identifier. As described above, the cowboy hat may have an item identifier of "A1", the saddle may have an item identifier of "A2", the cowboy boots may have an item identifier of "A3", the cowboy shirt may have an item identifier of "A4", and the toy pistol may have an item identifier of "B1". The product list may list the cowboy hat, the saddle, the cowboy boots, and the cowboy shirt first as they are currently present in the portion of the content 104 and items such as the toy pistol and so forth follow as they appear elsewhere within the content 104.

At 812, the merchant server 114 or the order processing service 210 may send the item data 116 for one or more of the one or more items to the media device 106. The media device 106 upon receiving the item data 116 may generate a user interface to depict the available items 118 to order. For example, as illustrated in FIG. 1, the media device 106 depicts the available items 118 as an overlay on the paused presentation of the content 104. The available items 118 for the particular scene of "Burning Sage" may be the cowboy hat, the saddle, the cowboy boots, and the cowboy shirt.

At 814, the merchant server 114 or the order processing service 210 may determine the eligibility data 314 for one or more of the one or more items. In one implementation, the order processing service 210 generates the eligibility data request 310 for the eligibility data 314 and sends the eligibility data request 310 to the order eligibility service 216 as described above. The eligibility data 314 may be indicative of the one or more items included in the item data 116 that are available for immediate purchase. In other implementations, the eligibility data 314 may be indicative of the one or more items included in the item data 116 that are available or eligible for acquisition. Eligibility may be based on one or more factors, such as if the item is available for immediate purchase, if the item is available for immediate shipment, user settings or preferences, membership type of a user, type of product, and so forth. For example, a user may have account settings that provide a valid payment method, shipping address, and billing address associated with the media device 106 or a user account. Based on this account setting, the user may be able to receive priority shipping on items that are currently in stock or the user may be able to receive an immediate purchase option. Given this account setting, the eligibility data 314 may indicate in the item data 116 those items that are currently in stock as being available for purchase. In one implementation, the eligibility data 314 may be indicative of a purchasing option, as described above.

At 816, the order eligibility service 216 may send the eligibility data 314 to the media device 106. The media device 106 may be configured to generate a user interface to depict the availability or eligibility of items 118 to order. The depiction is overlaid on the paused presentation of the content 104. Further, the depiction of the availability may be represented by an icon. For example, when the availability or eligibility for the item is for immediate purchase. The icon may indicate Buy Now, Buy Now with 1-Click, a finger with a clicking or selection action, or a combination thereof. In another example, availability or eligibility icon may include, an add to cart icon, a rent icon, a lease icon, an add to wishlist icon, or a combination thereof. For example, with reference to FIG. 1, the cowboy hat may be available or eligible for immediate purchase. In this example, the media device 106 may depict an icon in the user interface near the cowboy hat which indicates that the cowboy hat is available or eligible for immediate purchase. As another example, with reference to FIG. 1, the media device 106 may depict a rent icon in the user interface that is near the saddle, an add to cart icon in the user face near the cowboy boots, and an add to wishlist icon near the cowboy shirt.

At 818, the merchant server 114 or the order processing service 210 may receive the selection data 120 from the media device 106. The selection data 120 may be indicative of the selection of the item to order. As described above, the selection data 120 may be indicative of the selection of one or more of the available items 118. For example, as illustrated in FIG. 1, the media device 106 may receive a user input indicative of a selection to order the cowboy hat. The media device 106 may generate the selection data 120 indicative of the selection of the cowboy hat and send the selection data 120 to the user interface service 204 or the order processing service 210.

At 820, the order processing service 210 may generate an order using the item specified by the selection data 120.

At 822, the order processing service 210 may send order confirmation data 124 indicative of the order to the media device 106. The order confirmation data 124 may correspond to the pre-confirmation notice data 410, as described above. The media device upon receipt of the order confirmation data 124 may depict confirmation of the order for item(s). As described above, with respect to FIG. 1, the depiction of the confirmation of the order is overlaid on the paused presentation of the content 104. The confirmation of the order may indicate that the selected item(s) have been ordered. In one implementation, the order processing service 210 upon sending the order confirmation data 124 to the media device 106 may generate the order data 604 based on the selection data 120 and may complete the order as described above.

Figure 9:
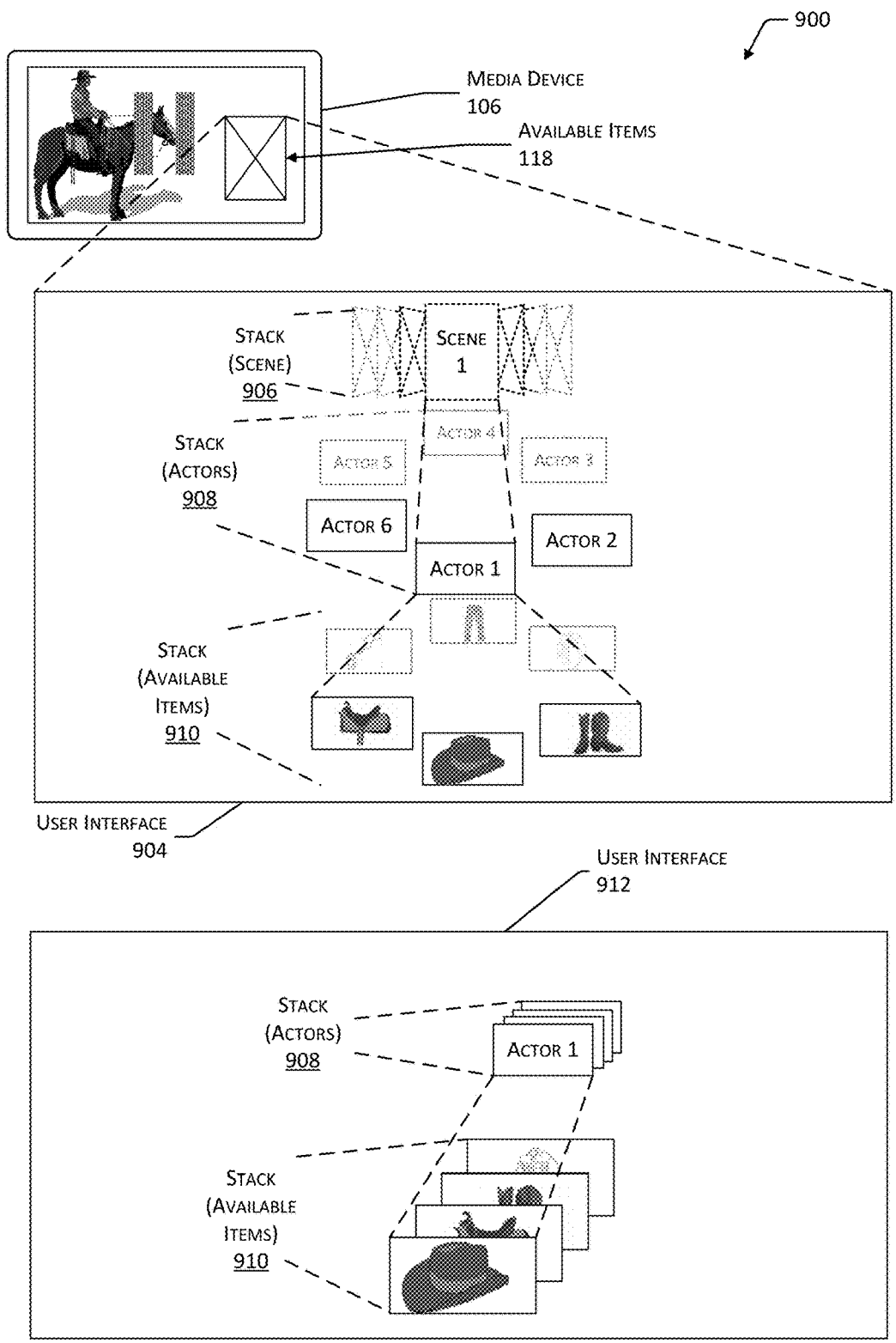
FIG. 9 depicts an example user interface to enable a user to view and select items available to order.
Figure 12:
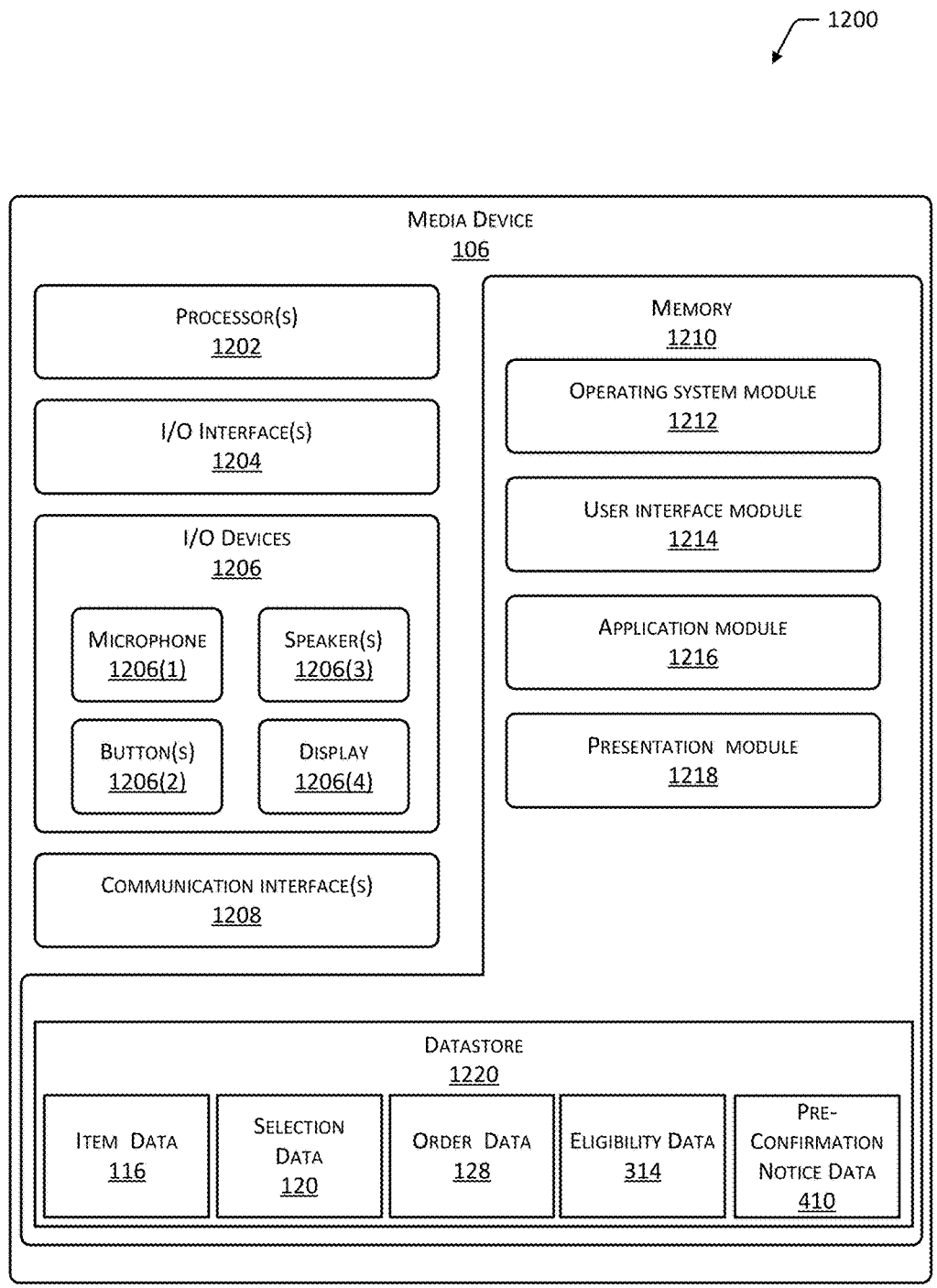
FIG. 12 illustrates a block diagram of a media device to present content and items available for purchase that are associated with that content.

FIG. 9 depicts an example 900 user interface to enable a user to view and select items available to order. In some implementations the user interface may be presented by a user interface module 1214 as illustrated in FIG. 12.

The media device 106 may be configured to provide multiple user interfaces to depict available items 118 to a user. In one implementation, the user interface may correspond to user interface 904. The user interface 904 may be configured to depict to the user, stack (scene) 906, stack (actors) 908, and stack (available items) 910. The stack (scene) 906 may correspond to one or more scenes in the content. The stack (actors) 908 may correspond to one or more actors associated with a particular scene. For example, as depicted in the user interface 904 the Actors 1-6 may be included in Scene 1. The stack (available items) 910 may correspond to one or more items available to order that are associated with a particular actor in a particular scene. For example, the items corresponding to a cowboy hat, cowboy boots, saddle, white shirt, blue jeans, and rope may correspond to Actor 1 in Scene 1.

The media device 106 may provide control functions to enable the user to move and select cards within each stack 906, 908, and 910. For example, the control functions may include an up function, which enables the user to move the card from the back of the stack to the front of the stack. As an example, when the user has selected the stack (available items) 910 and selects the up function the saddle item may be moved to the front of the stack and the cowboy hat moved to the back of the stack. The control functions may also include a down function, which enables the user to move the card from the front of the stack to the back of the stack. As an example, when the user has selected the stack (available items) 910 and selects the down function the cowboy hat may be moved to the back of the stack and the cowboy boots may be moved to the front of the stack. The control functions may also include a select function, such as enter function, which enables the user to switch between each of the stacks. As an example, the user may have cycled through the stack (actors) 908 and wants to view the available items associated with Actor 1. The user after selecting Actor 1 may provide an input for the select function, which may switch from stack (actors) 908 to stack (available items) 910. Further, the control functions may enable the user to select one or more of the items within the stack (available items) 910 to order.

In another implementation, the user interface may correspond to user interface 912. The user interface 912 may be configured to depict to the user, the stack (actors) 908, and the stack (available items) 910. As depicted in the user interface 912 the stack (actors) 908 and the stack (available items) 910 are configured to be arranged in a stack of cards configuration. As described above, the media device 106 may provide the user the control functions that enable the user to cycle through the stacks 908 and 910 and select one or more of the items within the stack (available items) 910 to order.

Figure 10:
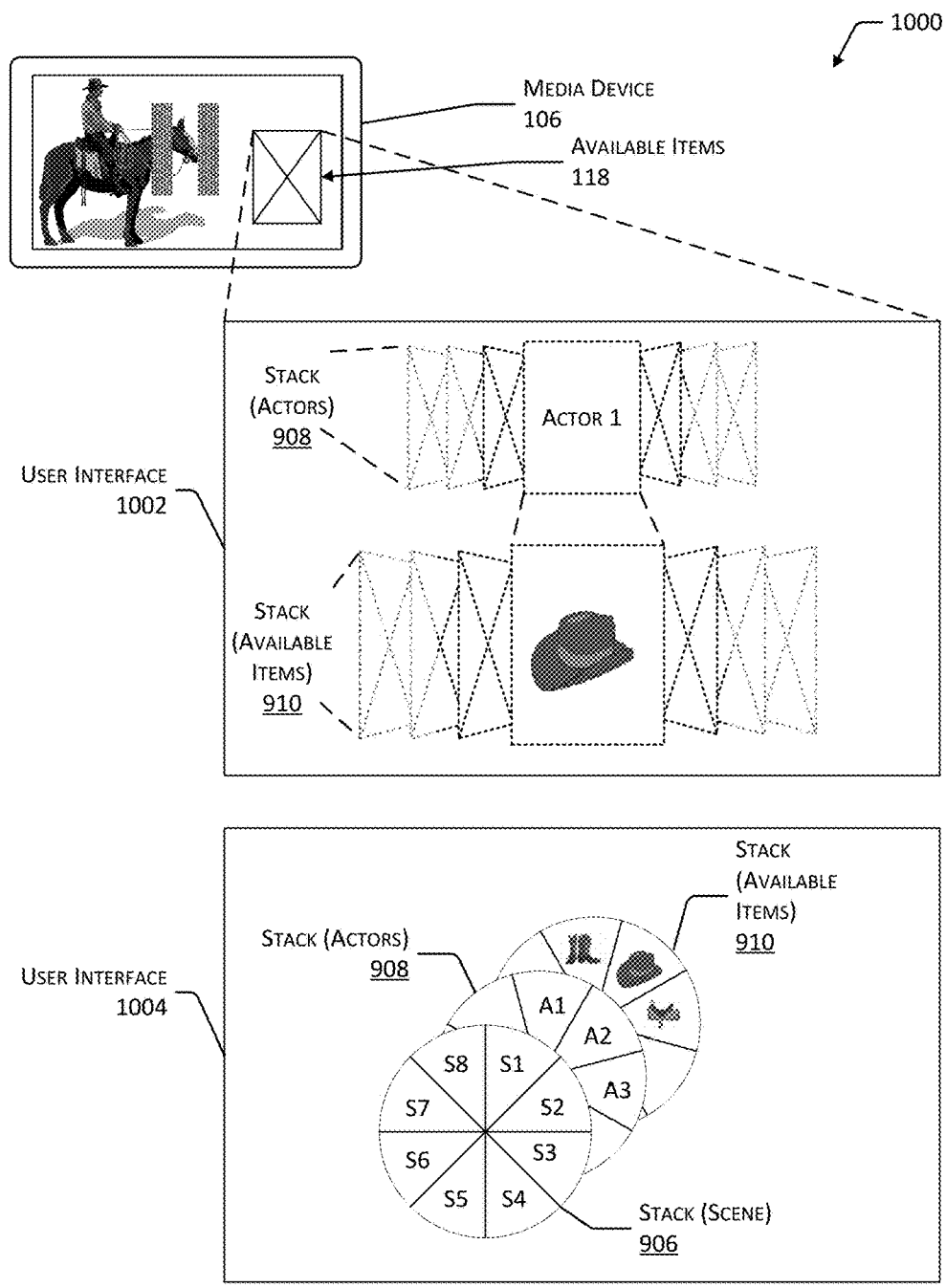
FIG. 10 depicts an example user interface to enable a user to view and select items available to order.

FIG. 10 depicts an example 1000 user interface to enable a user to view and select items available to order. In some implementations the user interface may be presented by the user interface module 1214 as illustrated in FIG. 12.

The media device 106 may be configured to provide multiple user interfaces to depict available items 118 to a user. In one implementation, the user interface may correspond to user interface 1002. The user interface 1002 may be configured to depict to the user, the stack (actors) 908, and the stack (available items) 910. As depicted in the user interface 1002 the stack (actors) 908 and the stack (available items) 910 are configured to be arranged in merry-go-round configuration. As described above, the media device 106 may provide the user the control functions that enable the user to cycle through the stacks 908 and 910 and select one or more of the items within the stack (available items) 910 to order.

In another implementation the user interface may correspond to user interface 1004. The user interface 1004 may be configured to depict to the user, the stack (scene) 906, the stack (actors) 908, and the stack (available items) 910. As depicted in the user interface 1004 the stack (scene) 906, the stack (actors) 908, and the stack (available items) 910 are configured to be arranged in a wheel of fortune configuration. The media device 106 may provide control functions to enable the user to cycle through the stacks 906, 908 and 910 and select one or more of the items within the stack (available items) 910 to order. For example, the control functions may include an up function, which rotates the stack 906, 908, or 910 in a counter clockwise direction, a down function, which rotates the stack 906, 908, or 910 in a clockwise direction, a select function which rotates between the stacks 906, 908, and 910 in a forward or clockwise direction and a back function, which rotates between the stacks 906, 908, and 901 in a backward or counter clockwise direction.

Figure 11:
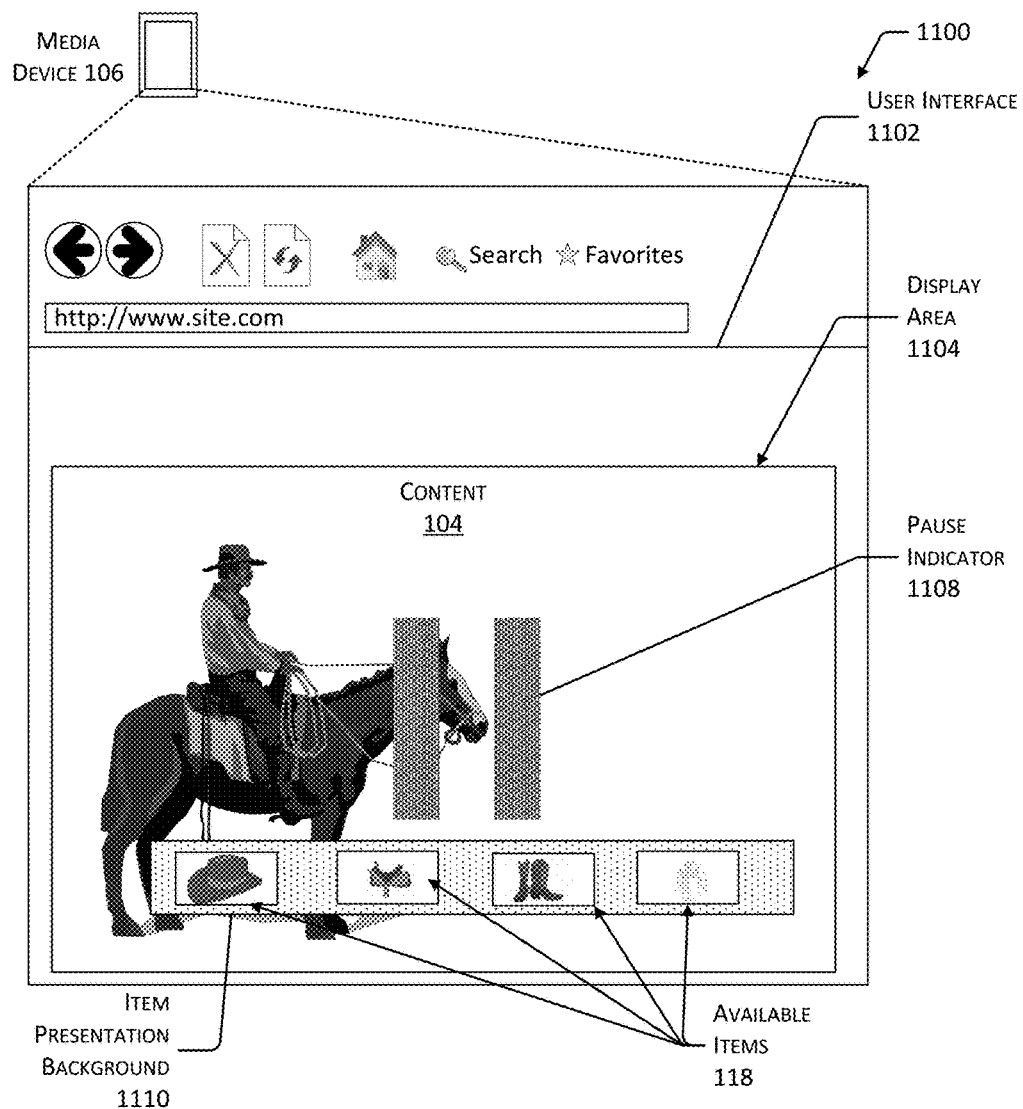
FIG. 11 depicts an example user interface to enable a user to view and select items available to order.

FIG. 11 depicts an example 1100 of a website user interface to enable a user to view and select items available to order. In some implementations the website user interface may be presented by the user interface module 1214 as illustrated in FIG. 12.

The media device 106 may be configured to provide a website user interface that corresponds to the user interface 1102. The user interface 1102 may include a display area 1104 that is configured to display the content 104. A pause indication 1108 may be overlaid on the presentation of the content 104 when the media device 106 receives the user input to pause the presentation of the content 104. The media device 106 may be configured to display the pause indication 1108 when the media device 106 is generating the user input data 112. Further, the user interface 1102 may include an item presentation background 1110. In one implementation, the item presentation background 1110 may be overlaid on the presentation of the content 104 to provide an area for the available items 118 to be arranged for the user to view when the presentation of the content 104 is paused. In another implementation, the item presentation background 1110 may be overlaid on the presentation of the content 104 to provide an area for the available items 118 to be arranged for the user to view during the presentation of the content 104.

FIG. 12 illustrates a block diagram 1200 of the media device 106. The media device 106 is illustrative and non-limiting, and may be defined by a desktop computer, a tablet computer, a wearable computer, an e-book reader, a media device, a cellular phone, a laptop computer, or another suitable apparatus. The media device 106 may include one or more processors 1202 configured to execute one or more stored instructions. The processor(s) 1202 may comprise one or more cores, and may also be referred to as hardware processors.

The media device 106 may include one or more I/O interface(s) 1204 to allow the processor(s) 1202 or other portions of the media device 106 to communicate with various other media devices 106, other computing devices, a server 1302, the content server 102, the merchant server 114, the user interface service 204, the order processing service 210, the content/item mapping service 212, the order eligibility service 216, the fulfillment option service 218, web-based resources, and so on. The I/O interfaces 1204 may comprise I2C, SPI, USB, RS-232, and so forth.

The I/O interface(s) 1204 may couple to one or more I/O devices 1206. The I/O devices 1206 may include one or more input devices such as a keyboard, a mouse, a microphone 1206(1), a digital camera, user input buttons 1206(2), and so forth. The I/O devices 1206 may also include output devices such as audio speakers 1206(3), one or more displays 1206(4), and so forth. In some embodiments, the I/O devices 1206 may be physically incorporated within the media device 106, or they may be externally placed. The I/O devices 1206 may include various other devices, as well.

The media device 106 may also include one or more communication interfaces 1208. The communication interfaces 1208 are configured to provide communications with other media devices 106, web-based resources, the server 12, the content server 102, the merchant server 114, the user interface service 204, the order processing service 210, the content/item mapping service 212, the order eligibility service 216, the fulfillment option service 218, routers, wireless access points, and so forth. The communication interfaces 1208 may include wireless functions, devices configured to couple to one or more networks including LANs, Wireless-LANs, WANs, and so forth. The media device 106 may also include one or more busses or other internal communications hardware or software that allow for the transfer of data between the various modules and components of the media device 106.

The media device 106 includes one or more memories 1210. The memory 1210 comprises one or more computer-readable storage media (CRSM). The memory 1210 provides storage of computer readable instructions, which enable the media device 106 present items associated with the content 104, data structures, program modules, and other data used during the operation of the media device 106. The memory 1210 may include at least one operating system (OS) module 1212. Respective OS modules 1212 are configured to manage hardware devices such as the I/O interfaces 1204, the I/O devices 1206, the communication interfaces 1208, and provide various services to applications or modules executing on the processors 1202.

Also stored in the memory 1210 may be one or more of the following modules. These modules may be executed as foreground applications, background tasks, and so forth. A user interface module 1214 may be configured to provide one or more user interfaces 904, 912, 1002, 1004, and may also provide one or more application programming interfaces. The user interface module 1214 may be configured to operate with information encoded as hypertext markup language ("HTML") files, extensible markup language ("XML") files, or in another suitable format or language. The user interface module 1214 is configured to accept inputs and send outputs using the I/O interfaces 1204, the communication interfaces 1208, or both.

The memory 1210 may also store one or more of the application modules 1216. The application modules 1216 may include a word processing application, a spreadsheet application, a technical drawing or illustrating application, a photo editing application, a web browsing application, a portable document viewing application and so on.

The memory 1210 may also include a presentation module 1218. The presentation module 1218 may be configured to present the content 104, the one or more items available to order, the availability or eligibility of the one or more items, the pause indication 1108, and the stacks 906, 908, and 910.

The memory 1210 may also include a datastore 1220 to store information. The datastore 1220 may use a flat file, database, linked list, tree, executable code, or other data structure to store the information. In some implementations, the datastore 1220 or a portion of the datastore 1220 may be distributed across one or more other media devices 106 or computing devices including server 1302, network attached storage apparatus, and so forth.

The datastore 1220 may store the item data 116, the selection data 120, the order data 128, the eligibility data 314, the pre-confirmation notice data 410, or a combination thereof. As described above, the item data 116 may be indicative of indicative of the one or more items associated with the portion of the content 104. The selection data 120 may be indicative of the selection of the one or more items. The order data 128 may be indicative of a completed order. The eligibility data 314 may be indicative of the one or more items included in the item data 116 that are available or eligible for immediate purchase or a purchasing option, as described above. The pre-confirmation notice data 410 may include order confirmations for each available item indicated as available or eligible in the eligibility data 314.

Figure 13:
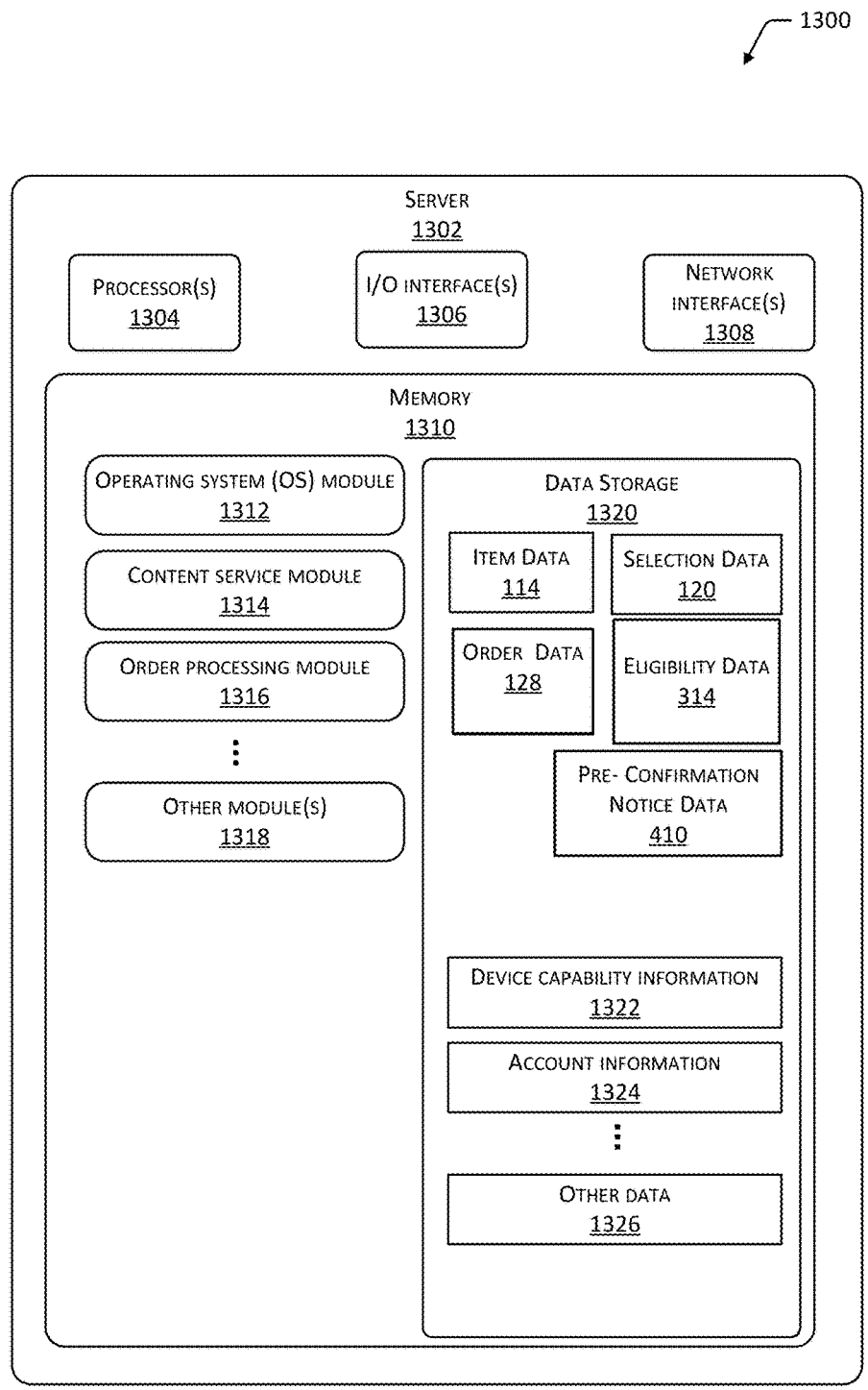
FIG. 13 illustrates a block diagram of a server configured to present items available to purchase to a media device and provide one or more functions.

FIG. 13 illustrates a block diagram 1300 of the server 1302. The server 1302 is illustrative and non-limiting, and may be defined by a rack-mounted server or another suitable apparatus. The server 1302 may correspond to the merchant server 114, the user interface service 204, the order processing service 210, the content/item mapping service 212, the order eligibility service 216, the fulfillment option service 218, or a combination thereof. The server 1302 may include one or more processors 1304 configured to execute one or more stored instructions. The processor(s) 1304 may comprise one or more cores, and may also be referred to as hardware processors.

The server 1302 may include one or more I/O interface(s) 1306 to allow the processor(s) 1304 or other portions of the server 1302 to communicate with media device 106, content server 102, other services 204, 210, 216, 218, computing devices, web-based resources, and so on. The I/O interfaces 1306 may comprise I2C, SPI, USB, RS-232, and so forth.

The server 1302 may also include one or more network interfaces 1308. The network interfaces 1308 are configured to provide communications with the content server 102, various services 204, 210, 216, 218, web-based resources, routers, wireless access points, and so forth. The network interfaces 1308 may include wireless functions, devices configured to couple to one or more networks including LANs, Wireless-LANs, WANs, and so forth. The server 1302 may also include one or more busses or other internal communications hardware or software that allow for the transfer of data between the various modules and components of the server 1302.

The server 1302 includes one or more memories 1310. The memory 1310 comprises one or more CRSM. The memory 1310 provides storage of computer readable instructions, which enable the server 1302 present items associated with the content 104, data structures, program modules, and other data for the operation of the server 1302. The memory 1310 may include at least one operating system (OS) module 1312. Respective OS modules 1312 are configured to manage hardware devices such as the I/O interfaces 1306, the network interfaces 1308, and provides various services to applications or modules executing on the processors 1304.

Also stored in the memory 1310 may be one or more of the following modules. These modules may be executed as foreground applications, background tasks, and so forth. A content service module 1314 may be configured to provide the user with the content 104. The content service interface module 1314 may be configured to accept inputs and send outputs using the I/O interfaces 1306, the network interfaces 1308, or both.

The memory 1310 may also store one or more order processing modules 1316 such that item data 116, the selection data 120, the order data 128, the eligibility data 314 and the pre-confirmation notice data 410, or other data, may be communicated to and from the media device 106 and the one or more services 204, 210, 216, and 218. The order processing modules 1316 may be configured to complete an order for the one or more selected items as described above.

The memory 1310 may also include one or more other modules 1318. The other modules 1318 may include cellular communications circuitry, a watchdog or other timer, a wireless internet receiver, secured data handling or communications resources, and so forth.

The memory 1310 may also include a data storage 1320 to store information. The data storage 1320 may use a flat file, database, linked list, tree, executable code, or other data structure to store the information. In some implementations, the data storage 1320 or a portion of the data storage 1320 may be distributed across one or more other servers 102, 114, or one or more other services 204, 210, 216, and 218, or computing devices, network attached storage apparatus, and so forth.

The data storage 1320 may store the item data 116, the selection data 120, the order data 128, the eligibility data 314 and the pre-confirmation notice data 410 as described above. The data storage 1320 may also store device capability information 1322. The device capability information 1322 may include information such as, the media device 106 specifications, connection speed, type of network connection, OS version of the media device 106, device software version and so forth. The data storage 1320 may also store account information 1324. The account information 1324 may include information such as, user preferences, account status, age of the account, shipping address, billing address, payment options, and so forth. The data storage 1320 may further store other data 1326. For example, the other data 1326 may include one or more data items such as purchase history, and so forth.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
    a media device with a hardware processor that executes instructions to:
        present video content using a display device;
        receive user input to pause presentation of the video content;
        send, to a server, user input data indicative of a point within the video content at which the presentation was paused;
        receive item data from the server;
        present the item data using the display device, wherein the item data depicts only an item for purchase;
        receive user input indicative of a selection of an item;
        send selection data indicative of the selection of the item to the server;
        receive order confirmation data from the server;
        present the order confirmation data using the display device; and
        resume presentation of the video content;
    a server device with a hardware processor that executes instructions to:
        receive the user input data;
        determine an item that was presented in the video content within a specified period of time prior to the point at which the presentation was paused;
        send the item data indicative of the item to the media device;
        generate a pre-generated confirmation notice associated with the item;
        store the pre-generated confirmation notice associated with the item;
        determine a valid payment method and shipping address associated with the media device;
        receive the selection data;
        determine the pre-generated confirmation notice associated with the selection data;
        send pre-generated confirmation notice data indicative of the selection data to the media device, in response to receiving the selection data;
        generate an order using the item specified by the selection data, the valid payment method, and the shipping address; and
        send order confirmation data indicative of the order to the media device.

2. The system of claim 1, wherein the item data includes product data and eligibility data, wherein the product data depicts the item for purchase, and wherein the eligibility data depicts a purchasing option.

3. A method comprising:
    determining data indicative of a user input during presentation of content at a media device;
    determining content presentation index data indicative of a point within the content at which the user input is received;
    determining a portion of the content associated with the content presentation index data;
    sending a request to a service for item data indicative of only one or more items for purchase associated with the portion of the content;
    sending, separate from the content, the item data indicative of the one or more items for purchase to the media device; and
    generating anticipated confirmation notice data indicative of an order for at least one of the one or more items for purchase.

4. The method of claim 3, further comprising:
    determining a payment method and shipping address associated with the media device; and
    determining eligibility data for one or more of the one or more items for purchase.

5. The method of claim 3, further comprising:
    storing the anticipated confirmation notice data;
    receiving selection data indicative of a selection of at least one item of the one or more items for purchase;
    sending the anticipated confirmation notice data associated with the at least one item of the one or more items for purchase;
    generating the order based on the selection data; and
    sending order confirmation data indicative of the order to the media device.

6. The method of claim 3, further comprising:
receiving, from the service, the item data comprising:
a product list indicative of item identifiers of the one or more items for purchase associated with the content presentation index data for a period of time.

7. The method of claim 3, wherein the user input is indicative of a command to pause presentation of the content.

8. The method of claim 3, further comprising:
sending a second request to a service for the item data in the entire content; and
receiving, from the service, the item data comprising:
a product list indicative of item identifiers of the one or more items for purchase associated with the content presentation index data.

9. The method of claim 8, wherein the second request further comprises one or more of:
a content identifier indicative of the content being presented,
the content presentation index data,
user account information associated with the presentation of the content by the media device, or
media device information indicative of one or more characteristics of the media device used to present the content.

10. The method of claim of claim 3, further comprising:
sending the item data to a service for determining eligibility data for the one or more items for purchase, wherein the item data is indicative of item identifiers of the one or more items for purchase associated with the content presentation index data; and
receiving, from the service, the eligibility data indicative of one or more items for purchase included in the item data that are eligible for immediate purchase.

11. The method of claim 3, the content presentation index data comprising one or more of a content identifier, time stamp, a frame number, or a chapter scene.

12. A method comprising:
receiving data indicative of user input during presentation of content;
determining content presentation index data indicative of a point within the content that is associated with the user input;
determining a portion of the content associated with the point;
determining item data indicative of only one or more items available for acquisition that are associated with the portion of the content;
generating anticipated confirmation notice data in anticipation of an order for the one or more items available for acquisition that are associated with the portion of the content;
sending the item data indicative of one or more items to a media device;
determining eligibility data for one or more of the one or more items; and
sending the eligibility data to the media device.

13. The method of claim 12, further comprising:
generating anticipated confirmation notice data indicative of an order for at least one of the one or more items;
receiving selection data indicative of a selection of the one or more items; and
sending the anticipated confirmation notice data associated with the selection of the one or more items.

14. The method of claim 12, wherein the determining the content presentation index data is responsive to one or more of:
a particular scene ending within the content;
input by a user to pause presentation of the video content;
data indicative of presence of the user proximate to the media device; or
sensor data obtained from one or more sensors in an environment proximate to the user.

15. The method of claim of claim 12, the determining the item data comprising:
sending a request to a service, wherein the request includes one or more of:
a content identifier indicative of the content being presented,
the content presentation index data,
user account information associated with the presentation of the content by the media device, or
media device information indicative of one or more characteristics of the media device used to present the content; and
receiving, from the service, the item data comprising:
a product list indicative of item identifiers of the one or more items associated with the content presentation index data for the portion of the content.

16. The method of claim 12, the determining the eligibility data for the one or more of the one or more items comprising:
sending the item data to a service, wherein the item data is indicative of item identifiers of the one or more items associated with the content presentation index data; and
receiving, from the service, the eligibility data indicative of the one or more items included in the item data that are eligible for immediate purchase.

17. The method of claim 12, further comprising:
sending the anticipated confirmation notice data associated with the at least one item of the one or more items.

18. The method of claim 12, further comprising:
receiving selection data indicative of a selection of the one or more items;
sending an order to a service, the order comprising data indicative of the one or more items specified by the selection data, and user account information associated with the presentation of the content by the media device; and
sending confirmation notice data indicative of the order to the media device.

19. The method of claim 12, further comprising:
determining an account associated with the presentation of the content;
determining a payment method and shipping address associated with the account;
receiving selection data indicative of a selection of the one or more items;
sending an order to a service, the order comprising data indicative of the one or more items specified by the selection data, the payment method, and the shipping address; and
sending confirmation notice data indicative of the order to the media device.

20. The method of claim 12, further comprising:
storing the anticipated confirmation notice data;
receiving selection data indicative of a selection of at least one item of the one or more items for purchase;
sending the anticipated confirmation notice data associated with the at least one item of the one or more items for purchase;
generating the order based on the selection data; and sending order confirmation data indicative of the order to the media device.

\* \* \* \* \*